United States Patent
Shibuya et al.

(10) Patent No.: US 10,752,543 B2
(45) Date of Patent: Aug. 25, 2020

(54) GLASS SUBSTRATE AND OPTICAL COMPONENT

(71) Applicant: AGC INC., Tokyo (JP)

(72) Inventors: Tomohiro Shibuya, Tokyo (JP);
Shin-ichi Amma, Tokyo (JP); Yosuke Amino, Tokyo (JP); Daisuke Kobayashi, Tokyo (JP); Michinori Suehara, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 16/696,835

(22) Filed: Nov. 26, 2019

(65) Prior Publication Data

US 2020/0095164 A1 Mar. 26, 2020

Related U.S. Application Data

(63) Continuation of application No. PCT/JP2019/019149, filed on May 14, 2019.

(30) Foreign Application Priority Data

May 18, 2018 (JP) .................. 2018-096341

(51) Int. Cl.
C03C 21/00 (2006.01)
C03C 23/00 (2006.01)

(52) U.S. Cl.
CPC .......... *C03C 21/002* (2013.01); *C03C 21/006* (2013.01); *C03C 23/0075* (2013.01)

(58) Field of Classification Search
CPC ...................................... C03C 21/006
See application file for complete search history.

(56) References Cited

U.S. PATENT DOCUMENTS 2,576,521 A * 11/1951 Kreidl ............ C03C 3/068
501/78
3,176,575 A * 4/1965 Socha ............ G02B 1/115
359/586

(Continued)

FOREIGN PATENT DOCUMENTS

CN 103688368 3/2014
JP H11-11984 A 1/1999

(Continued)

OTHER PUBLICATIONS

Day et al., "Properties of Soda Aluminosilicate Glasses: I, Refractive Index, Density, Molar Refractivity, and Infrared Absorption Spectra," Journal of the American Ceramic Society, vol. 45, No. 10, pp. 489-496. (Year: 1962).*

(Continued)

*Primary Examiner* — David Sample
(74) *Attorney, Agent, or Firm* — Foley & Lardner LLP

(57) ABSTRACT

A glass substrate includes at least one selected from the group consisting of Li, Na, K, Mg, Ca, Sr, Ba and Zn as a reaction factor component, and includes a surface depletion layer at a surface side of the glass substrate. A total molar concentration (mol/cm$^3$) of the reaction factor component in the surface depletion layer is decreased relative to an inside of the glass substrate. A total depletion amount (mol/cm$^2$) of the reaction factor component in the surface depletion layer is $1.00 \times 10^{-8}$ or more. The glass substrate has a refractive index ($n_d$) of 1.68 or more.

14 Claims, 3 Drawing Sheets

(56) References Cited

U.S. PATENT DOCUMENTS

| | | | | |
|---|---|---|---|---|
| 5,300,467 | A | * | 4/1994 | Ishizaki .................. C03C 3/064 |
| | | | | 501/67 |
| 2010/0159808 | A1 | * | 6/2010 | Shimodaira ............... B24B 1/00 |
| | | | | 451/36 |
| 2014/0144492 | A1 | | 5/2014 | Sakamoto et al. |
| 2016/0116739 | A1 | | 4/2016 | TeKolste et al. |
| 2017/0322419 | A1 | | 11/2017 | TeKolste et al. |
| 2018/0141851 | A1 | * | 5/2018 | Amma .................... C03C 3/097 |
| 2019/0121142 | A1 | | 4/2019 | TeKolste et al. |

FOREIGN PATENT DOCUMENTS

| | | | |
|---|---|---|---|
| JP | 2006-113142 A | 4/2006 | |
| JP | 2017-119595 A | 7/2017 | |
| JP | 2017-531840 A | 10/2017 | |
| WO | WO-2013082343 A1 * | 6/2013 | ....... H01L 31/03923 |

OTHER PUBLICATIONS

International Searching Authority, "International Search Report," issued in connection with International Patent Application No. PCT/JP2019/019149, dated Jul. 23, 2019.

International Searching Authority, "Written Opinion," issued in connection with International Patent Application No. PCT/JP2019/019149, dated Jul. 23, 2019.

\* cited by examiner

GLASS SUBSTRATE AND OPTICAL COMPONENT

TECHNICAL FIELD

The present invention relates to a glass substrate and an optical component using the same.

BACKGROUND ART

The glass used for wearable equipment such as, for example, glasses with projector, a glasses-shaped or goggles-shaped display, a virtual reality and augmented reality display device, and a virtual image display device is required to have a high refractive index (for example, a refractive index $n_d$ of 1.68 or more) from the viewpoint of realization of a wide-angle and high-luminance/high-contrast image, enhancement of light guide properties, and easiness of processing of diffraction grating. In addition, thin plate formation of glass is demanded for the purpose of weight reduction. Moreover, a small-sized imaging glass lens with a wide imaging angle of view has been conventionally used in applications such as vehicle-mounted camera and robot's visual sensor, and a high refractive index is required of such an imaging glass lens so as to photograph a wider range with a smaller lens.

Furthermore, the wearable equipment above is typically configured by stacking a glass substrate serving as a waveguide so that a virtual image can be perceived with a comfortable and natural feeling by the human eye (see, for example, Patent Literature 1).

CITATION LIST

Patent Literature

Patent Literature 1: JP-T-2017-531840 (the term "JP-T" as used herein means a published Japanese translation of a PCT patent application)

SUMMARY OF INVENTION

Technical Problem

A glass substrate used for these applications is required to maintain a good transparency for a long period of time, but when the glass substrate is put into contact with air, etc., there may arise a phenomenon called burning in which the substrate itself is clouded.

This is highly likely to occur also in the wearable equipment, because, for example, when the gap between glass substrates stacked is sealed by resin sealing, airtightness likely to decrease or from the beginning, it is difficult to obtain complete airtightness and consequently, the surface of the glass substrate can hardly be kept away from contact with air.

In addition, depending on the case, the glass substrate may be partially exposed and on this occasion, the above-described phenomenon is prominent.

Furthermore, on the glass substrate, a diffraction grating, etc. is sometimes formed using a curable resin depending on the required function and in this case, due to the presence of the resin in the vicinity of the glass substrate surface, the resin may work out to a contamination source to cause alteration of the glass substrate surface.

The present invention has been made to solve the problems above, and an object thereof is to provide a glass substrate capable of maintaining optical properties by reducing alteration of the glass substrate surface due to burning, etc., and an optical component using the same.

Solution to Problem

The present inventors have found that when the amount of a reaction factor component in the surface layer of the glass substrate is reduced to a predetermined range, alteration of the surface due to burning, etc. can be prevented and properties such as transparency can be maintained, and have accomplished the present invention.

The glass substrate of the present invention contains at least one selected from the group consisting of Li, Na, K, Mg, Ca, Sr, Ba and Zn as a reaction factor component, and including a surface depletion layer at a surface side of the glass substrate, in which a total molar concentration (mol/cm$^3$) of the reaction factor component in the surface depletion layer is decreased relative to an inside of the glass substrate, a total depletion amount (mol/cm$^2$) of the reaction factor component in the surface depletion layer is $1.00 \times 10^{-8}$ or more, and the glass substrate has a refractive index ($n_d$) of 1.68 or more. Note that the inside is a depth region in which the total molar concentration (mol/cm$^3$) of reaction factor components becomes constant in the depth direction.

Another glass substrate of the present invention contains at least one selected from the group consisting of Li, Na, K, Mg, Ca, Sr, Ba and Zn as a reaction factor component, in which an average value of a total molar concentration (mol/cm$^3$) of the reaction factor component in an outermost surface layer being a region of 0 to 10 nm from a surface of the glass substrate relative to a total molar concentration (mol/cm$^3$) of reaction factor components in an inside of the glass substrate is 35.0% or more and 100.0% or less in terms of decrease rate, and the glass substrate has the refractive index ($n_d$) of 1.68 or more. Note that the inside is a depth region in which the total molar concentration (mol/cm$^3$) of reaction factor components becomes constant in the depth direction.

The optical component of the present invention includes the glass substrate of the present invention.

Advantageous Effects of Invention

In the glass substrate and optical component of the present invention, alteration of the surface due to burning, etc. can be prevented and properties such as transparency can be maintained for a long period of time. In the case where the glass substrate is formed of a glass having a high refractive index, highly reliable wearable equipment can be provided.

DESCRIPTION OF EMBODIMENTS

Figure 1:
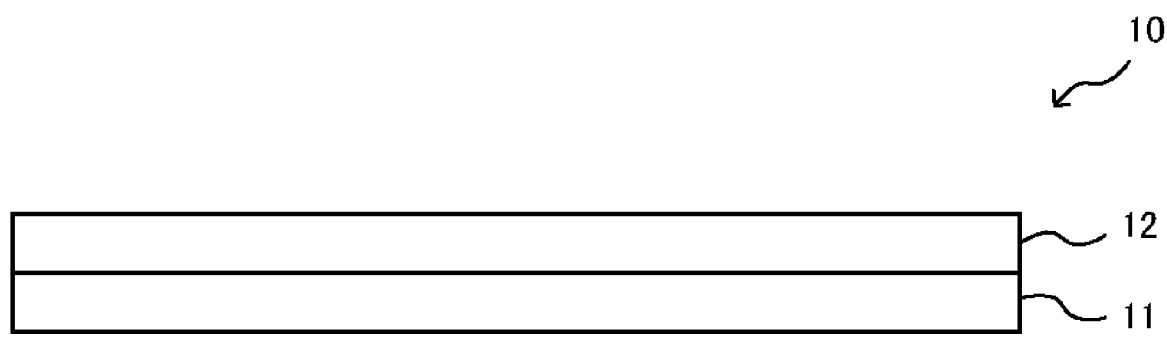
FIG. 1 is a view illustrating a schematic configuration of the optical component in one embodiment of the present invention.

The glass substrate and optical component of the present invention are described in detail below by referring to embodiments.

First Embodiment

[Glass Substrate]

As for the glass substrate of this embodiment, a common glass substrate can be used without any particular limitation and in such a glass substrate, the amount of at least one reaction factor component selected from the group consisting of Li, Na, K, Mg, Ca, Sr, Ba and Zn in the surface layer is decreased relative to the inside of the glass substrate.

For example, the depletion amount (mol/cm$^2$) of at least one component selected from the group consisting of Li, Na, K, Mg, Ca, Sr, Ba and Zn in the surface layer of the glass substrate of this embodiment is preferably $1.00 \times 10^{-8}$ or more and $1.20 \times 10^{-7}$ or less.

In addition, the average value of the molar concentration (mol/cm$^3$) of at least one component selected from the group consisting of Li, Na, K, Mg, Ca, Sr, Ba and Zn in the outermost surface layer being a region of 0 to 10 nm from the surface relative to the molar concentration (mol/cm$^3$) of the component in the inside of the glass substrate of this embodiment is preferably 35.0% or more and 100.0% or less in terms of decrease rate.

In the present description, unless otherwise indicated, the "inside" of the glass substrate is a depth region in which the above-described total molar concentration (mol/cm$^3$) of the reaction factor components becomes constant in the depth direction. The "surface layer" is a depth region in which the above-described total molar concentration (mol/cm$^3$) of the reaction factor components is decreased at the surface side of the glass substrate relative to the inside. The "outermost surface layer" is a depth region of 0 to 10 nm from the surface. The surface layer is sometimes referred to as a surface depletion layer.

In the case where the glass contains a reaction factor component (at least one selected from the group consisting of Li, Na, K, Mg, Ca, Sr, Ba and Zn), a change in the surface properties can be prevented by controlling the total depletion amount (mol/cm$^2$) of reaction factor components in the surface layer of the glass substrate to $1.00 \times 10^{-8}$ or more. This is because, in the case where the total depletion amount in the surface layer is $1.00 \times 10^{-8}$ or more, the reaction factor component is not allowed to diffuse to the outermost surface layer and can be effectively prevented from being affected by an organic matter such as carboxylic acid or organic ester to form a substance inhibiting the transparency on the glass substrate surface. The total depletion amount is more preferably $1.50 \times 10^{-8}$ or more, still more preferably $1.60 \times 10^{-8}$ or more, particularly preferably $2.50 \times 10^{-8}$ or more. On the other hand, in order to prevent a change in the refractive index of the surface layer, the total depletion amount is preferably $1.20 \times 10^{-7}$ or less, more preferably $1.10 \times 10^{-7}$ or less, still more preferably $2.6 \times 10^{-8}$ or less.

In the present description, the depletion amount (mol/cm$^2$) of the reaction factor component in the surface layer means a difference between the product of the molar concentration (mol/cm$^3$) of the reaction factor component in the inside of the glass substrate and the width (cm) of a region (depth region b) in which the surface depletion layer is sufficiently contained, and the product of the average value of the molar concentration (mol/cm$^3$) of the reaction factor component in the surface layer of the glass substrate and the width (cm) of the depth region b.

Furthermore, in the case where the glass contains the reaction factor component, it is preferred in the glass substrate of the present invention that the average value of the total molar concentration of reaction factor components in the outermost surface layer being a region of 0 to 10 nm from the surface relative to the total molar concentration (mol/cm$^3$) of reaction factor components in the inside is 35.0% or more and 100.0% or less in terms of decrease rate.

By setting the decrease rate to be 35.0% or more, a change in the surface properties can be prevented. This is because, in the case where the decrease rate in the surface layer is 35.0% or more, the reaction factor component is not allowed to diffuse from the inside to the outermost surface layer and can be effectively prevented from being affected by an organic matter such as carboxylic acid or organic ester to form a substance inhibiting the transparency on the glass substrate surface. The decrease rate is more preferably 45.0% or more, still more preferably 50.0% or more, particularly preferably 79.0% or more. On the other hand, in order to prevent a change in the refractive index of the surface layer, the decrease rate is preferably 100.0% or less, more preferably 95.0% or less, still more preferably 90.0% or less.

In the present description, the decrease rate (%) of the reaction factor component means a ratio, expressed as a percentage, of the difference between the average values of the total molar concentration (mol/cm$^3$) of reaction factor components in the inside of the glass substrate and the total molar concentration (mol/cm$^3$) of reaction factor components in the outermost surface layer being a region of 0 to 10 nm from the surface of the glass substrate, relative to the total molar concentration (mol/cm$^3$) of reaction factor components in the inside of the glass substrate.

It is considered that the reaction factor component reacts with an organic matter such as carboxylic acid or ester in air and turns into a salt and due to this, a substance inhibiting transparency is formed on the glass substrate surface, causing a change in the properties of the glass substrate.

Here, the total depletion amount (mol/cm$^2$) of the reaction factor component in the surface layer of the glass substrate and the decrease rate (%) of the reaction factor component in the outermost surface layer being a region of 0 to 10 nm from the surface relative to the inside of the glass substrate can be calculated from a depth-direction concentration profile of the reaction factor component in the glass substrate, with the abscissa axis representing the depth and the ordinate axis representing the molar concentration (mol/cm$^3$). Examples of methods for acquiring this depth-direction concentration profile include, for example, the following method.

First, the contents (mass % in terms of atom) of reaction factor components of the glass substrate are measured by atomic absorption spectrometry or ICP emission spectrometry. Furthermore, the density (g/cm$^3$) of the glass is measured in conformity with JIS Z 8807 (1976, measuring method where weighting is performed in liquid). On the conditions that the atomic weight of Li is 6.941 (g/mol), the atomic weight of Na is 22.99 (g/mol), the atomic weight of K is 39.10 (g/mol), the atomic weight of Mg is 24.31 (g/mol), the atomic weight of Ca is 40.08 (g/mol), the atomic weight of Sr is 87.62 (g/mol), the atomic weight of Ba is 137.3 (g/mol), and the atomic weight of Zn is 65.39 (g/mol), the molar concentrations (mol/cm$^3$) of contents of respective reaction factor components in the glass substrate are determined from the contents (mass % on an atomic basis) of reaction factor components and density (g/cm$^3$) measured by the methods above. Here, since the depletion amount of the reaction factor component in the surface layer of the glass substrate is small relative to the amount of the reaction factor component in the entire glass substrate, the molar concentration (mol/cm$^3$) of content of the reaction factor component in the glass substrate can be regarded as the molar concentration (mol/cm$^3$) of the reaction factor component in the inside of the glass substrate.

Next, depth-direction profiles of secondary ion intensity of the reaction factor component and the glass-forming component (any one of Si, B and P), with the abscissa axis representing the sputtering time and the ordinate axis representing the secondary ion intensity, are acquired by Time-of-flight secondary ion mass spectrometry (TOF-SIMS) using $C_{60}$ ion sputtering. Thereafter, the depth-direction profile of secondary ion intensity of the reaction factor component is divided by the depth-direction profile of secondary ion intensity of the glass-forming component to provide a depth-direction profile of secondary ion intensity ratio, with the abscissa axis representing the sputtering time and the ordinate axis representing the secondary ion intensity ratio ((secondary ion intensity of reaction factor component)/(secondary ion intensity of glass-forming component)). The depth of the analysis crater formed by TOF-SIMS is measured using a stylus surface profiler such as Dektak150 manufactured by Veeco Instruments Inc., and based on the measurement results, the abscissa axis of the depth-direction profile of secondary ion intensity ratio is converted from the sputtering time to the depth. In addition, from the depth-direction profile of secondary ion intensity ratio, a region which is free from the occurrence of depletion of the reaction factor component is designated as the inside, and based on the molar concentrations (mol/cm$^3$) of reaction factor components in the inside of the glass substrate determined by the method above, the ordinate axis of the depth-direction profile of secondary ion intensity ratio of each reaction factor component is converted from the secondary ion intensity ratio to the concentration (mol/cm$^3$). Consequently, a depth-direction concentration profile of the reaction factor component in the glass substrate, with the abscissa axis representing the depth and the ordinate axis representing the molar concentration, can be obtained. From this depth-direction concentration profile, the molar concentration (mol/cm$^3$) in the surface depletion layer or the outermost surface layer being a region of 0 to 10 nm from the surface can be calculated. At this time, in the region of the surface layer or the outermost surface layer of the glass substrate of this embodiment, the concentration of the reaction factor component usually fluctuates in the depth direction and therefore, the molar concentration obtained here is the average value in that region.

Among the above-described reaction factor components, a component having a great effect on the surface properties is an alkali metal. Furthermore, the effect decreases in order of Li, Na and K, and from the viewpoint of preventing alteration, it is preferable to reduce the amount of Li in the surface layer.

More specifically, in order to prevent a change in the surface properties, the depletion amount (mol/cm$^2$) of Li in the surface layer is preferably $8.00 \times 10^{-9}$ or more, more preferably $1.00 \times 10^{-8}$ or more, still more preferably $1.05 \times 10^{-8}$ or more, particularly preferably $1.60 \times 10^{-8}$ or more. In addition, the depletion amount of Li is preferably $7.00 \times 10^{-8}$ or less.

The depletion amount of Na is preferably $1.20 \times 10^{-9}$ or more, more preferably $3.00 \times 10^{-9}$ or more, still more preferably $3.30 \times 10^{-9}$ or more, particularly preferably $6.10 \times 10^{-9}$ or more. In addition, the depletion amount of Na is preferably $3.00 \times 10^{-8}$ or less.

The depletion amount of K is preferably $9.00 \times 10^{-10}$ or more, more preferably $1.07 \times 10^{-9}$ or more, still more preferably $1.90 \times 10^{-9}$ or more, particularly preferably $2.70 \times 10^{-9}$ or more. In addition, the depletion amount of K is preferably $1.60 \times 10^{-8}$ or less.

The average value of the molar concentration of Li in the outermost surface layer being a region of 0 to 10 nm from the surface relative to the molar concentration (mol/cm$^3$) of Li in the inside of the glass substrate is, in terms of the decrease rate, preferably 50.0% or more, more preferably 60.0% or more, still more preferably 65.0% or more, particularly preferably 92.0% or more. The decrease rate of Li is preferably 100.0% or less. The decrease rate of Na is preferably 30.0% or more, more preferably 37.0% or more, still more preferably 41.0% or more, particularly preferably 75.0% or more. The decrease rate of Na is preferably 100.0% or less. The decrease rate of K is preferably 20.0% or more, more preferably 27.0% or more, still more preferably 30.0% or more, particularly preferably 56.0% or more. The decrease rate of K is preferably 100.0% or less.

In the glass substrate of the present invention, the content of the reaction factor component is, based on oxides, preferably from 0.1 to 75 mass %, more preferably from 0.5 to 60 mass %, still more preferably from 1.0 to 50 mass %, yet still more preferably from 5.0 to 40 mass %, even yet still more preferably from 11.0 to 30 mass %, particularly preferably from 15 to 25 mass %. In the case where the content of the reaction factor component is in such a range, the amount of the reaction factor component in the surface layer of the glass substrate is reduced to a predetermined range, and alteration of the surface due to burning, etc., can thereby be prevented.

The content of at least one selected from the group consisting of Li, Na and K being reaction factor components having a large effect on the surface properties is, based on oxides, preferably from 0 to 20 mass %, more preferably from 0.1 to 18 mass %, still more preferably from 0.5 to 15 mass %, yet still more preferably from 1.0 to 13 mass %, even yet still more preferably from 3.0 to 11 mass %, particularly preferably from 5.0 to 10 mass %. In the case where the content of the alkali metal is in such a range, the amount of the reaction factor component in the surface layer of the glass substrate is reduced to a predetermined range, and it becomes easy to prevent alteration of the surface due to burning, etc.

The glass substrate of this embodiment is preferably a very smooth substrate having a surface roughness Ra of 0.7 nm or less. The surface roughness Ra as used in the present description is an arithmetic average roughness (Ra) and is a value calculated by measuring roughness on the surface of the glass substrate with a resolution of 512 pixels×512 pixels in the range of 2 μm×2 μm square by use of an atomic force microscope (AFM).

By setting the surface roughness Ra to be 0.7 nm or less, a change in the surface properties can be prevented. The surface roughness Ra is preferably 0.5 nm or less, more preferably 0.4 nm or less, particularly preferably 0.3 nm or less. In addition, the surface roughness Ra is preferably 0.07 nm or more.

It is considered that the specific surface area (Sdr) of the glass substrate calculated through processing by SPIP (Scanning Probe Imaging Processor), etc. fluctuates depending on the surface roughness Ra and as the specific surface area is increased, a substance inhibiting the transparency is formed on the glass substrate surface due to the effect of an organic matter such as carboxylic acid or ester in air, leading to a change in the properties of the glass substrate.

In addition, by virtue of having the surface roughness Ra in the range above, a nanostructure with a desired shape can be formed on one main surface by using an imprint technology, etc., and desired light guiding properties can also be obtained. Among others, in a light guide, irregular reflection at an interface is reduced, and a ghost phenomenon or distortion can be prevented. Here, the surface roughness Ra is an arithmetic average roughness defined in JIS B0601 (2001).

In the glass substrate of this embodiment, the thickness is not particularly limited and is preferably from 0.01 to 3.0 mm, more preferably from 0.01 to 2.0 mm. In the case where the thickness is 0.01 mm or more, breakage of the glass substrate or breakage during handling or processing of the glass substrate is reduced. In addition, deflection due to own weight of the glass substrate is reduced. The thickness is more preferably 0.1 mm or more, still more preferably 0.3 mm or more, yet still more preferably 0.5 mm or more. On the other hand, in the case where the thickness is 3.0 mm or less, the glass substrate is prevented from unnecessarily increasing in weight, and good handling is ensured. In the case where the thickness is 2.0 mm or less, an optical element using the glass substrate is lightweight and suitable for use in wearable equipment. The thickness is more preferably 1.5 mm or less, still more preferably 1.0 mm or less, yet still more preferably 0.8 mm or less.

Furthermore, the glass substrate of this embodiment is preferably formed of glass having the following properties.

The glass forming the glass substrate of this embodiment can be used without imposing any particular limitation on its refractive index ($n_d$). In the case of use for an optical element, the refractive index ($n_d$) is preferably 1.68 or more. In the case where the refractive index ($n_d$) of the glass is 1.68 or more, in the case of using the glass substrate of this embodiment for wearable equipment, realization of a wide-angle and high-luminance/high-contrast image, enhancement of light guide properties, and easiness of processing of diffraction grating can be advantageously achieved. In addition, the glass substrate is suitable for a small-sized imaging lens with a wide imaging angle of view used in applications such as vehicle-mounted camera and robot's visual sensor, because a wider range can be photographed with a smaller lens. The refractive index ($n_d$) is preferably 1.71 or more, more preferably 1.73 or more, still more preferably 1.74 or more, yet still more preferably 1.75 or more.

On the other hand, glass having a refractive index ($n_d$) exceeding 2.10 has a tendency that the density becomes high and the devitrification temperature rises. Accordingly, the refractive index ($n_d$) is preferably 2.10 or less, more preferably 2.01 or less, still more preferably 1.97 or less, yet still more preferably 1.92 or less, particularly preferably 1.88 or less, and most preferably 1.84 or less.

The refractive index of glass can be measured by a refractometer (for example, device name: KPR-2000, manufactured by Kalnew Optical Industrial Co., Ltd.) after glass as the measurement target is processed into a triangular prism having a one-side length of 30 mm and a thickness of 10 mm.

In addition, the density (d) of the glass used for the glass substrate of this embodiment is preferably 5.5 g/cm$^3$ or less. With a density in this range, the glass substrate of this embodiment can provide a favorable wearing feeling to users when the glass substrate is used in wearable equipment and can decrease the mass of the entire device when the glass substrate is used for a vehicle-mounted camera, a robot's visual sensor, etc. The density (d) is preferably 5.1 g/cm$^3$ or less, more preferably 4.8 g/cm$^3$ or less, still more preferably 4.4 g/cm$^3$ or less, still more preferably 4.0 g/cm$^3$ or less, still more preferably 3.7 g/cm$^3$ or less, yet still more preferably 3.4 g/cm$^3$ or less.

On the other hand, in order to make the glass substrate surface resistant to scratches, the density (d) of the glass is preferably 2.0 g/cm$^3$ or more, more preferably 2.2 g/cm$^3$ or more, still more preferably 2.3 g/cm$^3$ or more, yet still more preferably 2.4 g/cm$^3$ or more. The density (d) of the glass can be measured in conformity with JIS Z 8807 (1976, measuring method where weighting is performed in liquid).

The glass used for the glass substrate of this embodiment preferably has a glass viscosity where the temperature $T_2$ at which the viscosity $\eta$ satisfies log $\eta$=2 is from 700 to 1,200° C. Here, log represents a common logarithm ($\log_{10}$), and $\eta$ is the viscosity when the shear stress is 0. $T_2$ is a reference temperature of meltability, and if $T_2$ of the glass is too high, the glass needs to be melted at a high temperature, leaving a possibility that in the case of a high-refractive-index glass, among others, the visible light transmittance on the short wavelength side is lowered. $T_2$ is preferably 1,180° C. or less, more preferably 1,150° C. or less, still more preferably 1,130° C. or less, yet still more preferably 1,110° C. or less.

On the other hand, if $T_2$ is too low, there is a problem that the viscosity curve becomes steep and it is difficult to control the viscosity in production. When the glass used for the glass substrate of this embodiment has $T_2$ in the range above, the production characteristics are improved. $T_2$ is preferably 800° C. or more, more preferably 900° C. or more, still more preferably 950° C. or more, yet still more preferably 1,000° C. or more, particularly preferably 1,030° C. or more.

The temperature $T_2$ at which the viscosity $\eta$ satisfies log $\eta$=2 can be determined using the viscosity measurement results after heating a sample and measuring the viscosity by means of a rotational viscometer.

In addition, the devitrification temperature of the glass used for the glass substrate of this embodiment is preferably 1,300° C. or less. In the case where the glass has such a property, devitrification of the glass in molding can be prevented, and the formability is improved. The devitrification temperature is more preferably 1,200° C. or less, still more preferably 1,150° C. or less, yet still more preferably 1,125° C. or less, particularly preferably 1,100° C. or less.

Here, the devitrification temperature is the minimum temperature at which when the glass heated and melted is cooled by natural cooling, crystals having a long side or major axis of 1 μm or more are not observed at the surface and inside of the glass. As for the measurement of the devitrification temperature, about 5 g of a sample is put in a platinum dish, held at temperatures every 10° C. from 1,000° C. up to 1,400° C. each for one hour, cooled by natural cooling. Then, the presence or absence of crystal precipitation are observed by means of a microscope, and the minimum temperature at which crystals having a long side or major axis of 1 μm or more are not observed is measured and the minimum temperature can thereby be judged to be the devitrification temperature.

In the wearable equipment, it is required to prevent a reduction in the transmittance of visible light, but when the glass used for the glass substrate of this embodiment is melted at a high temperature, the transmittance is sometimes reduced on the shorter wavelength side than 400 nm. Furthermore, in the vehicle-mounted camera or robot's visual sensor, a near-ultraviolet image is sometimes used so as to recognize an object that is difficult to be discriminated with visible light, and high transmittance in a near-ultraviolet range is required for the glass used in such an optical system.

Accordingly, when the glass used for the glass substrate of this embodiment is made into a glass plate having a thickness of 1 mm, the transmittance ($T_{360}$) of light at a wavelength of 360 nm is preferably 30% or more. The glass having such a property is suitable as glass for use in the wearable equipment or vehicle-mounted camera. Among others, in the case of a light guide for displaying an image or a video in the wearable equipment, the length of wave-guiding optical path becomes long and in turn, the light quantity loss on the short wavelength side is increased. In this embodiment, since the transmittance on the short wavelength side of the glass used is as high as 30% or more, the above-described light quantity loss on the short wavelength side is reduced and therefore, it is facilitated to reproduce a desired color without reducing the transmittance in the entire visible region. In addition, luminance of a video or an image is not reduced. The $T_{360}$ is more preferably 40% or more, still more preferably 50% or more, yet still more preferably 60% or more, particularly preferably 65% or more, and most preferably 70% or more. The $T_{360}$ can be measured using a spectrophotometer (e.g., U-4100 manufactured by Hitachi High-Technologies Corporation), for example, on a 1 mm-thick glass plate with both surfaces being mirror-polished.

Furthermore, the Young's modulus (E) of the glass used for the glass substrate of this embodiment is preferably 60 GPa or more. Having such a property is advantageous in that when the optical substrate is used as a thin glass substrate for wearable equipment or used as a lens for a vehicle-mounted camera, a robot's visual sensor, etc., deflection is less likely to occur. Among others, in the case of a light guide, when the light guide is attached to a frame of glasses or a display device, a ghost phenomenon or distortion of an image or video can be prevented. The E is more preferably 70 GPa or more, still more preferably 80 GPa or more, yet still more preferably 85 GPa or more, particularly preferably 90 GPa or more. The Young's modulus of glass can be measured using a plate-shaped sample of 20 mm×20 mm×1 mm and using an ultrasonic precision thickness gauge (e.g., MODEL 38DL PLUS manufactured by OLYMPUS Corporation) (unit: GPa).

In the glass used for the glass substrate of this embodiment, the water resistance (RW) as measured in conformity with JOGIS06-2008, Measuring Method for Chemical Durability of Optical Glass (Powder Method), which is the Japanese Optical Glass Industrial Standards, is preferably Class 2 or more. RW is specifically measured as follows. A glass powder having a particle diameter of from 420 to 600 μm is immersed in 80 mL of pure water at 100° C. for one hour, and the mass decrease rate (%) here is measured. The glass is rated as a predetermined Class depending on the mass decrease rate. Specifically, the glass is rated as Class 1 in the case where the mass decrease rate is less than 0.05%, rated as Class 2 in the case where 0.05% or more and less than 0.10%, rated as Class 3 in the case where 0.10% or more and less than 0.25%, rated as Class 4 in the case where 0.25% or more and less than 0.60%, rated as Class 5 in the case where 0.60% or more and less than 1.10%, and rated as Class 6 in the case where 1.10% or more. A smaller value of the Class indicates that RW is better.

In addition, in the glass used for the glass substrate of this embodiment, the acid resistance (RA) as measured in conformity with JOGIS06-2008, Measuring Method for Chemical Durability of Optical Glass (powder method), is preferably Class 1 or more. RA is specifically measured as follows. A glass powder having a particle diameter of from 420 to 600 μm is immersed in 80 mL of an aqueous 0.01 N nitric acid solution at 100° C. for one hour, and the mass decrease rate (%) here is measured. The glass is rated as a predetermined Class depending on the mass decrease rate. Specifically, the glass is rated as Class 1 in the case where the mass decrease rate is less than 0.20%, rated as Class 2 in the case where 0.20% or more and less than 0.35%, rated as Class 3 in the case where 0.35% or more and less than 0.65%, rated as Class 4 in the case where 0.65% or more and less than 1.20%, rated as Class 5 in the case where 1.20% or more and less than 2.20%, and rated as Class 6 in the case where 2.20% or more. A smaller value of the Class indicates that RA is better.

With respect to the water resistance (RW) and acid resistance (RA), a predetermined Class "or more" indicates that the resistance is more excellent than the Class, and represents a Class of a smaller value than the value of the Class.

The glass transition temperature (Tg) of the glass used for the glass substrate of this embodiment is preferably from 500 to 700° C. In the case where the glass used for the glass substrate of this embodiment has Tg in the range above, the formability in press molding and redraw forming is improved. Tg is more preferably from 520 to 680° C., still more preferably from 540 to 660° C., yet still more preferably from 560 to 640° C., particularly preferably from 570 to 620° C. Tg can be measured, for example, using a differential thermal dilatometer (TMA) in conformity with JIS R3103-3 (2001).

The Abbe number ($v_d$) of the glass used for the glass substrate of this embodiment is preferably 50 or less. Specifically, in the case of applying the glass substrate of this embodiment to uses such as a light guide plate, in the case where the glass has a low $v_d$ in the range above, the optical design of wearable equipment is facilitated, and it is also easy to improve chromatic aberration, so that a clear image or video can be reproduced. $v_d$ is more preferably 46 or less, still more preferably 42 or less, yet still more preferably 38 or less, particularly preferably 34 or less. The lower limit of the Abbe number of the glass is not particularly limited, but the Abbe number is often roughly 10 or more, specifically 15 or more, more specifically 20 or more.

The Abbe number of the glass is calculated from $v_d=(n_d-1)/(n_F-n_C)$ by using the sample used for the refractive index measurement above. Here, $n_d$ is a refractive index for a helium d line, $n_F$ is a refractive index for a hydrogen F line, and $n_C$ is a refractive index for a hydrogen C line. These refractive indexes can also be measured using the above-described refractometer.

The thermal expansion coefficient (α) at 50 to 350° C. of the glass used for the glass substrate of this embodiment is preferably from 50 to 150 ($\times 10^{-7}$/K). In the case where the glass used for the glass substrate of this embodiment has α in the range above, expansion matching to peripheral members is improved. The a is more preferably from 60 to 135 ($\times 10^{-7}$/K), still more preferably from 70 to 120 ($\times 10^{-7}$/K), yet still more preferably from 80 to 105 ($\times 10^{-7}$/K), particularly preferably from 90 to 100 ($\times 10^{-7}$/K).

As for the thermal expansion coefficient (a), linear thermal expansion coefficients in the range of from 30 to 350° C. are measured using a differential thermal dilatometer (TMA), and an average linear thermal expansion coefficient in the range of from 30 to 350° C. can be determined in conformity with JIS R3102 (1995).

<Glass Component>

One embodiment of the composition range of each component that can be contained in the glass forming the glass substrate of this embodiment is described in detail below. In this description, unless otherwise indicated, the content of each component is represented by mass % relative to the total mass of the glass matrix composition based on oxides. In the glass used in this embodiment, "contain substantially no" means that the component is not contained except for unavoidable impurities. The content of unavoidable impurities is 0.1 mass % or less in this embodiment.

The matrix composition in the glass used in this embodiment includes, for example, a composition containing, as represented by mass % based on oxides, as the glass-forming component, from 5 to 80 mass % of at least one selected from the group consisting of $SiO_2$, $B_2O_3$ and $P_2O_5$, as the modifier oxide, 5 to 70 mass % in total of at least one oxide selected from the group consisting of MgO, CaO, SrO, BaO, ZnO, $Li_2O$, $Na_2O$, $K_2O$, $Cs_2O$ and $Ln_2O_3$ (Ln is at least one selected from the group consisting of Y, La, Gd, Yb and Lu), and as the intermediate oxide, 0 to 50 mass % in total of at least one oxide selected from the group consisting of $Al_2O_3$, $TiO_2$, $ZrO_2$, $WO_3$, $Bi_2O_3$, $TeO_2$, $Ta_2O_5$ and $Nb_2O_5$. The glass having this composition satisfies the properties of high refractive index, good light transmittance and high meltability.

Specific examples of the glass having such a composition include (1) an La—B-based glass, (2) an $SiO_2$-based glass, and (3) a $P_2O_5$-based glass. In the description of the content in the glass composition, the simple expression of "%" means "mass %" unless specifically stated otherwise.

(1) Examples of the La—B-based glass include a glass containing, for example, from 5 to 70% of $La_2O_3$ and from 5 to 70% of $B_2O_3$ assuming that the total of the matrix composition is 100%.

By containing 5% or more of $La_2O_3$ component, a desired high refractive index can be achieved, and the dispersion can be reduced (the Abbe number can be increased). Accordingly, the lower limit of the content of $La_2O_3$ component is preferably 10%, more preferably 15%, still more preferably 20%, yet still more preferably 25%.

On the other hand, in the case where the content of $La_2O_3$ component is 70% or less, reduction in the meltability of the glass is prevented, and the devitrification resistance of the glass is enhanced. Accordingly, the upper limit of the content of $La_2O_3$ component is preferably 60%, more preferably 50%, still more preferably 40%, yet still more preferably 30%.

$B_2O_3$ is a glass-forming component, and the $B_2O_3$ content is preferably from 5 to 70% assuming that the total of the matrix composition is 100%.

By containing 5% or more of $B_2O_3$ component, the devitrification resistance of the glass is enhanced, and the dispersion of the glass can be reduced. Accordingly, the lower limit of the content of $B_2O_3$ component is preferably 10%, more preferably 15%, still more preferably 20%.

On the other hand, in the case where the content of $B_2O_3$ component is 70% or less, a larger refractive index can be readily obtained, and deterioration of the chemical durability can be prevented. Accordingly, the upper limit of the content of $B_2O_3$ component is preferably 50%, more preferably 40%, still more preferably 30%, yet still more preferably 25%.

$SiO_2$ is a glass-forming component. The $SiO_2$ content is from 0 to 25% assuming that the total of the matrix composition is 100%. By containing $SiO_2$, high strength and crack resistance can be imparted to the glass, and stability and chemical durability of the glass can be enhanced. The $SiO_2$ content is preferably 2% or more, more preferably 4% or more, still more preferably 6% or more. On the other hand, in the case where the $SiO_2$ content is 25% or less, a component for obtaining a high refractive index can be contained. The $SiO_2$ content is preferably 20% or less, more preferably 15% or less, still more preferably 8% or less.

MgO is an optional component. The MgO content is preferably from 0 to 20% assuming that the total of the matrix composition is 100%. By containing the MgO component, the mechanical strength of the glass can be enhanced. The MgO content is more preferably 1% or more, still more preferably 3% or more. In the case where the MgO content is 20% or less, the devitrification temperature is lowered and preferable production characteristics are obtained. The MgO content is more preferably 15% or less, still more preferably 10% or less, yet still more preferably 5% or less.

CaO is an optional component. The CaO content is preferably from 0 to 30% assuming that the total of the matrix composition is 100%. By containing the CaO component, the chemical durability of the glass can be enhanced. The CaO content is more preferably 1% or more, still more preferably 3% or more, yet still more preferably 5% or more, particularly preferably 10% or more. In the case where the CaO content is 30% or less, the devitrification temperature is lowered and preferable production characteristics are obtained. The CaO content is more preferably 20% or less, still more preferably 15% or less.

SrO is an optional component. The SrO content is preferably from 0 to 30% assuming that the total of the matrix composition is 100%. By containing the SrO component, the refractive index of the glass can be increased. The SrO content is more preferably 1% or more, still more preferably 3% or more. In the case where the SrO content is 30% or less, the devitrification temperature is lowered and preferable production characteristics are obtained. The SrO content is more preferably 20% or less, still more preferably 15% or less, yet still more preferably 10% or less, particularly preferably 5% or less.

BaO is an optional component. The BaO content is preferably from 0 to 40% assuming that the total of the matrix composition is 100%. By containing the BaO component, the refractive index of the glass can be increased. The BaO content is more preferably 1% or more, still more preferably 3% or more, yet still more preferably 5% or more. In the case where the BaO content is 40% or less, the devitrification temperature is lowered, and preferable production characteristics are obtained. The BaO content is more preferably 30% or less, still more preferably 20% or less, yet still more preferably 15% or less, particularly preferably 10% or less.

ZnO is an optional component. The ZnO content is preferably from 0 to 30% assuming that the total of the matrix composition is 100%. By containing the ZnO component, the refractive index of the glass can be increased. The ZnO content is more preferably 1% or more, still more preferably 3% or more. In the case where the ZnO content is 30% or less, the devitrification temperature is lowered, and preferable production characteristics are obtained. The ZnO content is more preferably 20% or less, still more preferably 15% or less, yet still more preferably 10% or less, particularly preferably 5% or less.

$Li_2O$ is an optional component. The $Li_2O$ content is preferably from 0 to 15% assuming that the total of the matrix composition is 100%. In the case where $Li_2O$ is contained, the strength (Kc) and crack resistance (CIL) can be enhanced. The $Li_2O$ content is more preferably 0.5% or more, still more preferably 1% or more, yet still more preferably 3% or more. On the other hand, in the case where the $Li_2O$ content is 15% or less, the devitrification temperature is lowered, and preferable production characteristics are obtained. The $Li_2O$ content is preferably 10% or less, more preferably 7% or less, still more preferably 5% or less, particularly preferably 4% or less.

$Na_2O$ is an optional component. The $Na_2O$ content is from 0 to 20% assuming that the total of the matrix composition is 100%. In the case where the $Na_2O$ content is 20% or less, good crack resistance is obtained. The $Na_2O$ content is preferably 15% or less, more preferably 10% or less, still more preferably 7% or less, particularly preferably 5% or less. In the case where the glass of this embodiment contains $Na_2O$, the devitrification temperature is lowered and preferable production characteristics are obtained. The content thereof is preferably 0.5% or more, more preferably 1% or more, still more preferably 2% or more, particularly preferably 3% or more.

$K_2O$ is an optional component. The $K_2O$ content is from 0 to 20% assuming that the total of the matrix composition is 100%. In the case where the $K_2O$ content is 20% or less, good crack resistance is obtained.

The $K_2O$ content is preferably 15% or less, more preferably 10% or less, still more preferably 7% or less. In the case where the glass of this embodiment contains $K_2O$, the devitrification temperature is lowered, and preferable production characteristics are obtained. The content thereof is preferably 0.5% or more, more preferably 1% or more, still more preferably 2% or more, particularly preferably 3% or more.

The glass of this embodiment can contain, as the optional component, alkali metal components ($Li_2O+Na_2O+K_2O$). The content of $Li_2O+Na_2O+K_2O$ is from 0 to 20% assuming that the total of the matrix composition is 100%. In the case where $Li_2O+Na_2O+K_2O$ is 2% or more, $T_2$ is likely to be lowered, the melting temperature becomes low, and coloration is prevented. The content of $Li_2O+Na_2O+K_2O$ is preferably 4% or more, more preferably 6% or more. In addition, in the case where the content of $Li_2O+Na_2O+K_2O$ is 20% or less, the devitrification temperature is lowered, and preferable production characteristics are obtained. The content of $Li_2O+Na_2O+K_2O$ is preferably 15% or less, more preferably 10% or less, still more preferably 8% or less. The "$Li_2O+Na_2O+K_2O$" indicates the total amount of at least one metal oxide component selected from the group consisting of $Li_2O$, $Na_2O$ and $K_2O$.

In the glass of this embodiment, among alkali metal components ($Li_2O$, $Na_2O$, $K_2O$), $Li_2O$ is a component contributing to the enhancement of the strength of the glass, but if its amount is large, $T_2$ is readily lowered, and devitrification is likely to occur. Accordingly, in the glass of this embodiment, the value of the ratio $Li_2O/(Li_2O+Na_2O+K_2O)$ is preferably 0.45 or less in mass % based on oxides. In the case where $Li_2O/(Li_2O+Na_2O+K_2O)$ is 0.45 or less, $T_2$ is likely to become high, devitrification is less likely to occur, and ease of formability of the glass is enhanced. $Li_2O/(Li_2O+Na_2O+K_2O)$ is more preferably 0.4 or less, still more preferably 0.35 or less, particularly preferably 0.3 or less.

In the glass substrate of this embodiment, as described above, the concentration of the alkali metal component in the surface layer needs to be low, and in the case where the concentration of the alkali metal component in the surface layer of a plate-shaped glass made from the glass composition described herein is high, a treatment for reducing the concentration of the alkali metal component in the surface layer is preferably performed after making the plate-shaped glass. This treatment is described later in the description of Manufacturing Method of Glass Substrate.

$Cs_2O$ is an optional component. The $Cs_2O$ content is preferably from 0 to 20% assuming that the total of the matrix composition is 100%. In the case where the $Cs_2O$ content is more than 0%, the devitrification temperature is lowered and preferable production characteristics are obtained. In the case where the glass of this embodiment contains $Cs_2O$, its content is preferably 0.5% or more, more preferably 1% or more, still more preferably 2% or more, particularly preferably 3% or more. On the other hand, in the case where the $Cs_2O$ content is 20% or less, good crack resistance is obtained. The $Cs_2O$ content is preferably 15% or less, more preferably 10% or less, still more preferably 7% or less. $Ln_2O_3$ (in which Ln is at least one selected from the group consisting of Y, La, Gd, Yb and Lu) is an optional component. The content in terms of the total amount of $Ln_2O_3$ is from 5 to 55% assuming that the total of the matrix composition is 100%. In the case where $Ln_2O_3$ is contained, the refractive index of the glass can be increased. The content in terms of the total amount of $Ln_2O_3$ is preferably 10% or more, more preferably 15% or more, still more preferably 20% or more, particularly preferably 25% or more.

In addition, in the case where the $Ln_2O_3$ content is 55% or less, the devitrification temperature can be lowered and the raw material cost can be reduced. Accordingly, the content in terms of the total amount is preferably 55% or less, more preferably 45% or less, still more preferably 35% or less, particularly preferably 30% or less.

$Al_2O_3$ is an optional component. The $Al_2O_3$ content is from 0 to 35% assuming that the total of the matrix composition is 100%. In the case where $Al_2O_3$ is contained, the strength of the glass can be increased and the stability of the glass can be enhanced. The $Al_2O_3$ content is preferably 1% or more, more preferably 3% or more, still more preferably 5% or more.

In addition, in the case where the $Al_2O_3$ content is 35% or less, the devitrification temperature is lowered, and preferable production characteristics are obtained. The $Al_2O_3$ content is preferably 20% or less, and it is more preferable to have an $Al_2O_3$ content of 10% or less, furthermore, an $Al_2O_3$ content of 8% or less.

$TiO_2$ is an optional component. The $TiO_2$ content is from 0 to 35% assuming that the total of the matrix composition is 100%. In the case where $TiO_2$ is contained, the strength of the glass can be increased and the stability of the glass can be enhanced. The $TiO_2$ content is preferably 1% or more, more preferably 5% or more, still more preferably 7% or more, particularly preferably 10% or more.

In addition, in the case where the $TiO_2$ content is 35% or less, the devitrification temperature is lowered, and coloration of the glass is prevented. The $TiO_2$ content is preferably 25% or less, more preferably 20% or less, still more preferably 15% or less.

$ZrO_2$ is an optional component. The $ZrO_2$ content is from 0 to 30% assuming that the total of the matrix composition is 100%. In the case where $ZrO_2$ is contained, the refractive index of the glass can be increased, and the chemical durability can be enhanced. The $ZrO_2$ content is preferably 1% or more, more preferably 5% or more, still more preferably 10% or more, particularly preferably 15% or more.

In addition, in the case where the $ZrO_2$ content is 30% or less, the devitrification temperature is lowered, and preferable production characteristics are obtained. The $ZrO_2$ content is preferably 20% or less, more preferably 15% or less.

$WO_3$ is an optional component. The $WO_3$ content is from 0 to 30% assuming that the total of the matrix composition is 100%. In the case where $WO_3$ is contained, the refractive index of the glass can be increased. The $WO_3$ content is preferably 1% or more, more preferably 3% or more, still more preferably 5% or more, particularly preferably 10% or more.

In addition, in the case where the $WO_3$ content is 30% or less, the devitrification temperature is lowered, and coloration of the glass is prevented. The $WO_3$ content is preferably 20% or less, more preferably 15% or less.

$Bi_2O_3$ is an optional component. The $Bi_2O_3$ content is from 0 to 55% assuming that the total of the matrix composition is 100%. In the case where $Bi_2O_3$ is contained, the refractive index of the glass can be increased. The $Bi_2O_3$ content is preferably 1% or more, more preferably 5% or more, still more preferably 5% or more, particularly preferably 10% or more. In addition, in the case where the $Bi_2O_3$ content is 55% or less, the devitrification temperature is lowered, and coloration of the glass can is prevented. The $Bi_2O_3$ content is preferably 35% or less, more preferably 25% or less, still more preferably 15% or less.

$TeO_2$ is an optional component. The $TeO_2$ content is from 0 to 30% assuming that the total of the matrix composition is 100%. In the case where $TeO_2$ is contained, the refractive index of the glass can be increased. The $TeO_2$ content is preferably 1% or more, more preferably 5% or more.

In addition, in the case where the $TeO_2$ content is 30% or less, the devitrification temperature can be lowered and moreover, the raw material cost can be reduced. The $TeO_2$ content is preferably 20% or less, more preferably 10% or less.

$Ta_2O_5$ is an optional component. The $Ta_2O_5$ content is from 0 to 30% assuming that the total of the matrix composition is 100%. In the case where $Ta_2O_5$ is contained, the refractive index of the glass can be increased. The $Ta_2O_5$ content is preferably 1% or more, more preferably 5% or more.

In addition, in the case where the $Ta_2O_5$ content is 30% or less, the devitrification temperature can be lowered and moreover, the raw material cost can be reduced. The $Ta_2O_5$ content is preferably 25% or less, more preferably 10% or less.

$Nb_2O_5$ is an optional component. The $Nb_2O_5$ content is from 0 to 35% assuming that the total of the matrix composition is 100%. In the case where $Nb_2O_5$ is contained, the refractive index of the glass can be increased. The $Nb_2O_5$ content is preferably 5% or more, more preferably 10% or more, still more preferably 15% or more.

In addition, in the case where the $Nb_2O_5$ content is 35% or less, the devitrification temperature can be lowered and moreover, the raw material cost can be reduced. The $Nb_2O_5$ content is preferably 30% or less, more preferably 25% or less.

Examples of the preferable composition of the La—B-based glass include a high-refractive-index glass composition containing, in mass % based on oxides, $La_2O_3$: from 20 to 35%, $B_2O_3$: from 10 to 20%, $SiO_2$: from 0 to 10%, CaO: from 5 to 15%, $Li_2O+Na_2O+K_2O$: from 0 to 20%, ZnO: from 0 to 5%, $TiO_2$: from 5 to 15%, $ZrO_2$: from 5 to 10%, $Nb_2O_5$: from 15 to 25%, $As_2O_3$: from 0 to 2%, and $Sb_2O_3$: from 0 to 2%.

(2) Examples of the $SiO_2$-based glass include a glass containing, for example, from 10 to 50% of $SiO_2$ and containing, as the high-refractive-index component, 30% or more of at least one selected from the group consisting of $Nb_2O_5$, $Ta_2O_5$, $Li_2O$, SrO, BaO, $TiO_2$, $ZrO_2$, $WO_3$, $Bi_2O_3$, $TeO_2$ and $Ln_2O_3$ (Ln is at least one selected from the group consisting of Y, La, Gd, Yb and Lu).

$SiO_2$ is a glass-forming component. The $SiO_2$ content is from 10 to 50% assuming that the total of the matrix composition is 100%. In the case where the $SiO_2$ content is 10% or more, the temperature $T_2$ at which the viscosity of the glass satisfies log η=2 is in the preferred range, high strength and crack resistance are imparted to the glass, and the stability and chemical durability of the glass can be enhanced. The $SiO_2$ content is preferably 15% or more, more preferably 20% or more, still more preferably 25% or more, yet still more preferably 29% or more. On the other hand, in the case where the $SiO_2$ content is 45% or less, a component for obtaining a high refractive index can be contained. The $SiO_2$ content is preferably 40% or less, more preferably 35% or less, still more preferably 30% or less.

$Nb_2O_5$ is an optional component. In the case where the $Nb_2O_5$ content is 5% or more assuming that the total of the matrix composition is 100%, the refractive index of the glass can be increased, and the Abbe number $(v_d)$ can be reduced. The $Nb_2O_5$ content is preferably 15% or more, more preferably 20% or more, still more preferably 25% or more, particularly preferably 30% or more.

In addition, in the case where the $Nb_2O_5$ content is 70% or less, the devitrification temperature can be lowered and moreover, the raw material cost can be reduced. The $Nb_2O_5$ content is preferably 65% or less, more preferably 60% or less, still more preferably 55% or less, yet still more preferably 50% or less.

$Ta_2O_5$ is an optional component. The $Ta_2O_5$ content is from 0 to 30% assuming that the total of the matrix composition is 100%. In the case where the $Ta_2O_5$ content is 1% or more, the refractive index can be increased. The $Ta_2O_5$ content is more preferably 5% or more.

In addition, in the case where the $Ta_2O_5$ content is 30% or less, the devitrification temperature can be lowered and moreover, the raw material cost can be reduced. The $Ta_2O_5$ content is preferably 25% or less, more preferably 10% or less.

Furthermore, the glass of this embodiment can contain, as the optional component, alkali metal components ($Li_2O+Na_2O+K_2O$). The content of $Li_2O+Na_2O+K_2O$ is from 0 to 20% assuming that the total of the matrix composition is 100%. In the case where $Li_2O+Na_2O+K_2O$ is 2% or more, $T_2$ is readily lowered, the melting temperature becomes low, and coloration is prevented. The content of $Li_2O+Na_2O+K_2O$ is preferably 4% or more, more preferably 6% or more. In addition, in the case where the content of $Li_2O+Na_2O+K_2O$ is 20% or less, the devitrification temperature is lowered, and preferable production characteristics are obtained. The content of $Li_2O+Na_2O+K_2O$ is preferably 15% or less, more preferably 10% or less, still more preferably 8% or less.

In the glass of this embodiment, among alkali metal components ($Li_2O$, $Na_2O$, $K_2O$), $Li_2O$ is a component contributing to the enhancement of the strength of the glass, but if its amount is large, $T_2$ is readily lowered, and devitrification is likely to occur. Accordingly, in the glass of this embodiment, the value of the ratio $Li_2O/(Li_2O+Na_2O+K_2O)$ is preferably 0.45 or less as represented by mass % based on oxides. In the case where $Li_2O/(Li_2O+Na_2O+K_2O)$ is 0.45 or less, $T_2$ is readily increased, devitrification is less likely to occur, and easiness of formability of the glass is enhanced. $Li_2O/(Li_2O+Na_2O+K_2O)$ is more preferably 0.4 or less, still more preferably 0.35 or less, particularly preferably 0.3 or less.

In the case where the relationship between the total amount (RO) of the alkaline earth metal components (MgO, CaO, SrO, BaO) described below and the total amount ($R'_2O$) of alkali metal components ($Li_2O$, $Na_2O$, $K_2O$) satisfies $RO>2\times R'_2O$, $Li_2O/(Li_2O+Na_2O+K_2O)$ may be 0.75 or more.

In addition, in the case where the glass of this embodiment contains an alkali metal oxide of $Li_2O$ or $Na_2O$, the glass can be chemically strengthened by replacing the Li ion with Na ion or K ion or replacing the Na ion with K ion. More specifically, in the case where a chemical strengthening treatment is performed, the strength of the glass substrate can be enhanced.

$Li_2O$ is an optional component. The $Li_2O$ content is preferably from 0 to 15% assuming that the total of the matrix composition is 100%. In the case where $Li_2O$ is contained, the strength (Kc) and crack resistance (CIL) can be enhanced. The $Li_2O$ content is more preferably 0.5% or more, still more preferably 1% or more, yet still more preferably 3% or more. On the other hand, in the case where the $Li_2O$ content is 15% or less, the devitrification temperature is lowered, and preferable production characteristics are obtained. The $Li_2O$ content is preferably 10% or less, more preferably 9% or less, still more preferably 7% or less, yet still more preferably 5% or less, particularly preferably 4% or less.

In the case of chemically strengthening the glass of this embodiment, the content of $Li_2O$ is preferably 1.0% or more, more preferably 1.5% or more, still more preferably 2.5% or more, particularly preferably 3.5% or more.

$Na_2O$ is an optional component and is a component contributing to the prevention of devitrification and the decrease of Tg. The $Na_2O$ content is 0% or more and 10% or less assuming that the total of the matrix composition is 100%. In the case where $Na_2O$ is contained, an excellent devitrification-preventing effect is obtained. On the other hand, if the $Na_2O$ content is too large, the strength and crack resistance are likely to be reduced. In the case where the glass of this embodiment contains $Na_2O$, the content thereof is preferably 0.5% or more, more preferably 1% or more, still more preferably 2% or more, particularly preferably 3% or more. In addition, the $Na_2O$ content is preferably 9% or less, more preferably 8% or less, still more preferably 7% or less.

In the case of chemically strengthening the glass of this embodiment, the content of $Na_2O$ is preferably 1.0% or more, more preferably 1.5% or more, still more preferably 2.5% or more, particularly preferably 3.5% or more.

$K_2O$ is an optional component and is not only a component enhancing the meltability of the glass but also a component preventing devitrification. The $K_2O$ content is 0% or more and 10% or less assuming that the total of the matrix composition is 100%. In the case where $K_2O$ is contained, the devitrification-preventing effect is enhanced. On the other hand, in the case where the $K_2O$ content is too large, the density is likely to increase. The $K_2O$ content is preferably 0.3% or more, more preferably 0.5% or more, still more preferably 1% or more. In addition, the $K_2O$ content is preferably 10% or less, more preferably 8% or less, still more preferably 6% or less.

MgO is an optional component. MgO is a component enhancing the meltability of the glass, preventing devitrification, and adjusting the optical constants of the glass, such as Abbe number and refractive index. On the other hand, if the amount of MgO is increased, devitrification is rather promoted. Accordingly, the MgO content is preferably 0% or more and 10% or less assuming that the total of the matrix composition is 100%. The MgO content is more preferably 8% or less, particularly preferably 6% or less. In addition, the content of MgO is preferably 0.3% or more, more preferably 0.5% or more, still more preferably 1% or more.

CaO is an optional component. CaO is a component preventing devitrification, but if the amount of CaO is large, the crack resistance is likely to be reduced. Accordingly, the CaO content is preferably 0% or more and 15% or less assuming that the total of the matrix composition is 100%. The CaO content is more preferably 12% or less, particularly preferably 10% or less. In addition, the CaO content is more preferably 0.3% or more, still more preferably 0.5% or more, particularly preferably 1% or more.

SrO is an optional component. The SrO content is preferably from 0 to 30% assuming that the total of the matrix composition is 100%. By containing the SrO component, the refractive index of the glass can be increased. The SrO content is more preferably 1% or more, still more preferably 3% or more. In the case where the content is 30% or less, the devitrification temperature is lowered, and preferable production characteristics are obtained. The SrO content is more preferably 20% or less, still more preferably 15% or less, yet still more preferably 10% or less, particularly preferably 5% or less.

BaO is an optional component. The BaO content is preferably from 0 to 50% assuming that the total of the matrix composition is 100%. By containing the BaO component, the refractive index of the glass can be increased. The content is more preferably 1% or more, still more preferably 3% or more, yet still more preferably 5% or more. In the case where the content is 50% or less, the devitrification temperature is lowered, and preferable production characteristics are obtained. The BaO content is more preferably 35% or less, still more preferably 20% or less, yet still more preferably 15% or less, particularly preferably 10% or less.

$TiO_2$ is an optional component. The $TiO_2$ content is from 0 to 35% assuming that the total of the matrix composition is 100%. In the case where $TiO_2$ is contained, the strength of the glass can be increased, and the stability of the glass can be enhanced. The $TiO_2$ content is preferably 1% or more, more preferably 5% or more, still more preferably 7% or more, particularly preferably 10% or more.

In addition, in the case where the $TiO_2$ content is 35% or less, the devitrification temperature is lowered, and coloration of the glass is prevented. The $TiO_2$ content is preferably 25% or less, more preferably 20% or less, still more preferably 15% or less.

$ZrO_2$ is an optional component. The $ZrO_2$ content is from 0 to 30% assuming that the total of the matrix composition is 100%. In the case where $ZrO_2$ is contained, the refractive index of the glass can be increased, and the chemical durability can be enhanced. The $ZrO_2$ content is preferably 1% or more, more preferably 5% or more, still more preferably 10% or more.

In addition, in the case where the $ZrO_2$ content is 30% or less, the devitrification temperature is lowered, and preferable production characteristics are obtained. The $ZrO_2$ content is preferably 30% or less, more preferably 20% or less, still more preferably 15% or less.

$WO_3$ is an optional component. The $WO_3$ content is from 0 to 30% assuming that the total of the matrix composition is 100%. In the case where $WO_3$ is contained, the refractive index of the glass can be increased. The $WO_3$ content is preferably 1% or more, more preferably 3% or more, still more preferably 5% or more, particularly preferably 10% or more.

In addition, in the case where the $WO_3$ content is 30% or less, the devitrification temperature is lowered, and coloration of the glass is prevented. The $WO_3$ content is preferably 20% or less, more preferably 15% or less.

$Bi_2O_3$ is an optional component. The $Bi_2O_3$ content is from 0 to 55% assuming that the total of the matrix composition is 100%. In the case where $Bi_2O_3$ is contained, the refractive index of the glass can be increased. The $Bi_2O_3$ content is preferably 1% or more, more preferably 5% or more, still more preferably 5% or more, particularly preferably 10% or more.

In addition, in the case where the $Bi_2O_3$ content is 55% or less, the devitrification temperature is lowered, and coloration of the glass is prevented. The $Bi_2O_3$ content is preferably 35% or less, more preferably 25% or less, still more preferably 15% or less.

$TeO_2$ is an optional component. The $TeO_2$ content is from 0 to 30% assuming that the total of the matrix composition is 100%. In the case where $TeO_2$ is contained, the refractive index of the glass can be increased. The $TeO_2$ content is preferably 1% or more, more preferably 5% or more, still more preferably 10% or more, particularly preferably 15% or more.

In addition, in the case where the $TeO_2$ content is 30% or less, the devitrification temperature can be lowered and moreover, the material cost can be reduced. The $TeO_2$ content is preferably 20% or less, more preferably 10% or less.

By containing $Ln_2O_3$ (in which Ln is one or more selected from the group consisting of Y, La, Gd, Yb and Lu), the refractive index of the glass can be increased. The $Ln_2O_3$ content is preferably 1% or more, more preferably 3% or more, still more preferably 5% or more, particularly preferably 10% or more, assuming that the total of the matrix composition is 100%. On the other hand, in the case where the $Ln_2O_3$ content is 55% or less assuming that the total of the matrix composition is 100%, the devitrification temperature is lowered, and preferable production characteristics are obtained. The $Ln_2O_3$ content is in total preferably 35% or less, more preferably 20% or less, particularly preferably 15% or less.

$B_2O_3$ is an optional component. $B_2O_3$ is a component lowering Tg and enhancing mechanical properties of the glass, such as strength and crack resistance. However, if the amount of $B_2O_3$ is large, the refractive index is likely to be reduced. Accordingly, the content of $B_2O_3$ is preferably 0% or more and 10% or less. The content of $B_2O_3$ is more preferably 8.5% or less, still more preferably 6.5% or less, particularly preferably 5% or less. In addition, the content of $B_2O_3$ is more preferably 0.3% or more, still more preferably 0.5% or more, particularly preferably 1% or more.

$Al_2O_3$ is an optional component. $Al_2O_3$ is a component enhancing the chemical durability. However, if the amount of $Al_2O_3$ is increased, the glass is likely to be devitrified. Accordingly, the content of $Al_2O_3$ is preferably 0% or more and 5% or less. The content of $Al_2O_3$ is more preferably 3% or less, still more preferably 2% or less. In addition, the content of $Al_2O_3$ is more preferably 0.3% or more, still more preferably 0.5% or more, particularly preferably 1% or more.

ZnO is an optional component and is a component enhancing the mechanical properties of the glass, such as strength and crack resistance. On the other hand, if the amount of ZnO is large, devitrification is likely to occur. Accordingly, the content thereof is preferably 0% or more and 15% or less. The content of ZnO is more preferably 13% or less, still more preferably 12% or less, particularly preferably 10% or less. In addition, the content of ZnO is more preferably 0.3% or more, still more preferably 0.5% or more, particularly preferably 1% or more.

$La_2O_3$ is an optional component. $La_2O_3$ is a component increasing the refractive index of the glass. However, if the amount of $La_2O_3$ is too large, the mechanical properties are reduced. Accordingly, the content of $La_2O_3$ is preferably 0% or more and 12% or less. The content of $La_2O_3$ is more preferably 10% or less, still more preferably 8% or less. It is preferred that $La_2O_3$ is substantially not contained.

Since $As_2O_3$ is a hazardous chemical, the recent tendency is to refrain from the use thereof, and it is required to take environmental measures. Accordingly, in the case of attaching importance to the environmental effect, this component is preferably not contained in any substantial manner except for unavoidable intrusion.

Furthermore, in the glass of this embodiment, at least one of $Sb_2O_3$ and $SnO_2$ is preferably contained. These are not an essential component but can be added for the purpose of, for example, adjusting the refractive index property, enhancing the meltability, preventing coloration, increasing the transmittance, and improving the clarity and chemical durability. In the case of containing these components, the content thereof is in total preferably 10% or less, more preferably 5% or less, still more preferably 3% or less, particularly preferably 1% or less.

In addition, in the glass of this embodiment, F is preferably contained. F is not essential but can be added for the purposes of, for example, enhancing the meltability, increasing the transmittance, and improving the clarity. In the case of containing F, the content thereof is preferably 5% or less, more preferably 3% or less.

Examples of the preferable composition of the $SiO_2$-based glass ($SiO_2$-based composition A) include a high-refractive-index glass composition containing, as represented by mass % based on oxides, from 5 to 65% of $Nb_2O_5$, from 0 to 30% of at least one selected from the group consisting of BaO, $TiO_2$, $ZrO_2$, $WO_3$ and $Ln_2O_3$ (in which Ln is at least one selected from the group consisting of Y, La, Gd, Yb and Lu), from 15 to 50% of $SiO_2$, and from 2 to 20% of $Li_2O+Na_2O+K_2O$, with $Li_2O/(Li_2O+Na_2O+K_2O)$ being 0.45 or less. A specific composition of the high-refractive-index glass includes $B_2O_3$: from 0 to 10%, MgO: from 0 to 10%, CaO: from 0 to 15%, SrO: from 0 to 15%, BaO: from 0 to 15%, $Li_2O$: from 0 to 9%, $Na_2O$: from 0 to 10%, $K_2O$: from 0 to 10%, $Al_2O_3$: from 0 to 5%, $TiO_2$: from 0 to 15%, $WO_3$: from 0 to 15%, $ZrO_2$: from 0 to 15%, and ZnO: from 0 to 15%.

Examples of another preferable composition of the $SiO_2$-based glass ($SiO_2$-based composition B) include a high-refractive-index glass composition containing, as represented by mass % based on oxides, $SiO_2$: from 25 to 40%, RO: from 0 to 10%, $R'_2O$: from 0 to 20%, $Li_2O/R'_2O \le 0.45$, $Ln_2O_3$: from 0 to 30%, and $Nb_2O_5$: from 20 to 55%. In addition, examples of another preferable composition of the $SiO_2$-based glass ($SiO_2$-based composition C) include a high-refractive-index glass composition including, as represented by mass % based on oxides, $SiO_2$: from 15 to 30%, $Nb_2O_5$: from 40 to 65%, RO: from 0 to 10%, $R'_2O$: from 0 to 20%, and $Li_2O/R'_2O \le 0.45$. Examples of another preferable composition ($SiO_2$-based composition D) include a high-refractive-index glass composition containing, as represented by mass % based on oxides, $SiO_2$: from 25 to 40%, CaO: from 0 to 5%, SrO: from 3 to 10%, BaO: from 5 to 15%, $Li_2O$: from 4 to 8%, $Na_2O$: from 0.3 to 3%, $RO > 2 \times R'_2O$, $Li_2O/R'_2O$: from 0.65 to 0.95, $TiO_2$: from 3 to 15%, $ZrO_2$: from 3 to 8%, and $Nb_2O_5$: from 10 to 30%.

(3) Examples of the $P_2O_5$-based glass include a glass containing from 10 to 70 mass % of $P_2O_5$ and containing, as the high-refractive-index component, 1% or more of at least one selected from the group consisting of $Nb_2O_5$, $Ta_2O_5$, $Li_2O$, $SrO$, $BaO$, $TiO_2$, $ZrO_2$, $WO_3$, $Bi_2O_3$, $TeO_2$ and $Ln_2O_3$ (in which Ln is at least one selected from the group consisting of Y, La, Gd, Yb and Lu)).

$P_2O_5$ is a glass-forming component constituting the glass, and its action of imparting producible stability to the glass and reducing the glass transition temperature and liquid phase temperature is large. However, if the $P_2O_5$ content is less than 10% assuming that the total of the matrix composition is 100%, sufficient effects are not obtained. The $P_2O_5$ content is preferably 15% or more, more preferably 20% or more, still more preferably 30% or more, yet still more preferably 40% or more. In addition, in the case where the $P_2O_5$ content is 70% or less, good chemical durability is obtained. The $P_2O_5$ content is preferably 65% or less, more preferably 60% or less, still more preferably 55% or less, particularly preferably 50% or less.

$SiO_2$ is a glass-forming component. The $SiO_2$ content is from 0 to 25% assuming that the total of the matrix composition is 100%. By containing $SiO_2$, high strength and crack resistance can be imparted to the glass, and the stability and chemical durability of the glass can be enhanced. The $SiO_2$ content is preferably 2% or more, more preferably 4% or more, still more preferably 6% or more. On the other hand, in the case where the $SiO_2$ content is 25% or less, a component for obtaining a high refractive index can be contained. The $SiO_2$ content is preferably 20% or less, more preferably 15% or less, still more preferably 8% or less.

The high-refractive-index components are the same as those of (2) $SiO_2$ above and therefore, duplicate descriptions thereof are omitted.

With respect to (1) the La—B-based or (3) $P_2O_5$-based glass substrate, in determining the hydrogen concentration by Secondary Ion Mass Spectrometry (SIMS) or determining the depletion amount of the reaction factor component or the decrease rate of the reaction factor component by Time-of-flight secondary ion mass spectrometry (TOF-SIMS) using $C_{60}$ ion sputtering, B- or P-related secondary ions may be used in place of Si-related secondary ions. In the case where the intensity of B- or P-related secondary ions is higher than the intensity of Si-related secondary ions, it is preferable to select B- or P-related secondary ions.

In the glass substrate of this embodiment, a film such as antireflection film, reflective film, ultraviolet absorbing film and infrared absorbing film may be provided on at least one main surface of the glass substrate. These films may be provided only on one main surface of the glass substrate or may be provided on both main surfaces.

All of these films may be a common film and, for example, the antireflection film includes a film formed by depositing, as a single layer, a material having a lower refractive index than the glass substrate, a film having a configuration where a high-refractive-index film and a low-refractive-index film are alternately stacked, etc. The high-refractive-index film herein is a film having a refractive index of 1.9 or more at a wavelength of 550 nm, and the low-refractive-index layer film is a film having a refractive index of 1.6 or less at a wavelength of 550 nm.

[Manufacturing Method of Glass Substrate]

The glass substrate of this embodiment is manufactured, for example, as follows. That is, first, raw materials are weighed to give the predetermined glass composition above and uniformly mixed. The produced mixture is put in a platinum crucible, a quartz crucible or an alumina crucible and roughly melted, and after that, the melt is put in a gold crucible, a platinum crucible, a platinum alloy crucible, a reinforced platinum crucible or an iridium crucible, melted at a temperature ranging from 1,200 to 1,400° C. for 2 to 10 hours, homogenized by defoaming, stirring, etc. to conduct foam breaking, etc., then cast on a metal mold, and slowly cooled to obtain glass.

Furthermore, the glass is melted, and the molten glass is formed into a plate shape by a molding method such as float method, fusion method and roll-out method to obtain a plate-shaped glass.

The number of residual bubbles of the glass manufactured as above is preferably 10 bubbles per 1 kg (10 bubbles/kg) or less, more preferably 7 bubbles/kg or less, still more preferably 5 bubbles/kg or less, particularly preferably 3 bubbles/kg or less. In the case of forming a plate-shaped glass by the above-described method, in the case where the number of residual bubbles is 10 bubbles/kg or less, a plate-shaped glass free of bubbles can be efficiently formed. In addition, when the diameter of a minimum-sized circle enveloping the residual bubble in the inside is defined as the individual size of each residual bubble, the individual size of each residual bubble is preferably 80 µm or less, more preferably 60 µm or less, still more preferably 40 µm or less, particularly preferably 20 µm or less.

Given that the diameter is the length $L_1$ in the vertical direction of the residual bubble and the length of a straight line having a maximum length of residual bubbles among straight lines perpendicularly crossing with the diameter is the length $L_2$ in the lateral direction of the residual bubble, when the shape of the residual bubble is represented by an aspect ratio, $L_2/L_1$ is preferably 0.90 or more, more preferably 0.92 or more, still more preferably 0.95 or more. In the case where $L_2/L_1$ is 0.90 or more, the residual bubble is in the state of a nearly perfect circle (perfect sphere) and even when residual bubbles are contained, reduction in the strength of glass is prevented, compared with elliptical residual bubbles, so that in making a plate-shaped glass, generation of cracks starting at residual bubbles can be prevented. In addition, it also provides an effect that even when residual bubbles are present in the plate-shaped glass, anisotropic scattering of light incident on the plate-shaped glass can be reduced, compared with elliptical residual bubbles. The size and shape of the residual bubble are obtained from values measured by a laser microscope (manufactured by KEYENCE CORPORATION: VK-X100).

Subsequently, a polishing step of polishing at least one main surface of the plate-shaped-glass obtained above is preferably performed. For the polishing, a common polishing method may be employed, and examples thereof include a step of polishing the glass with a polishing pad while a polishing slurry is supplied. The polishing can be performed without imposing any particular limitation on the polishing conditions as long as it is performed under the conditions providing the desired surface roughness. The surface of the plate-shaped glass is polished such that macroscratches on the surface are removed and, for example, the surface roughness (Ra) of the plate-shaped glass here becomes 0.7 nm or less.

The operation of the polishing step may be performed by a common method and can be performed by a typical method in which, for example, cerium oxide having an average particle diameter of about 0.7 µm is dispersed in water to prepare a slurry having a specific gravity of 0.9 and the surface is polished by 0.5 µm or more per surface using a nonwoven or suede polishing pad under the conditions of a polishing pressure of from 50 to 100 $g/cm^2$.

The surface of the plate-shaped glass may be polished using cerium oxide abrasive grains having an average particle diameter ($d_{50}$) of usually from 0.5 to 1.5 μm and when polishing flaws due to the polishing remain on the glass surface, the strength of the plate-shaped glass may be reduced, but the later-described surface treatment step performed after the polishing step makes it possible to render the polishing flaws thin and enhance the strength.

Furthermore, the obtained plate-shaped glass is subjected to an acid cleaning treatment so as to decrease the amount of the reaction factor component in the surface layer of the glass substrate.

The acid cleaning treatment performed here is to clean the surface of the polished plate-shaped glass with an acid, thereby eliminating the reaction factor component from the surface layer. In elimination of the reaction factor component from the surface layer, hydrogen ions or oxonium ions are often introduced for charge compensation. The acid used here may be sufficient as long as it is an acidic solution, and the acid includes an organic acid and an inorganic acid. The organic acid includes acetic acid, citric acid, oxalic acid, succinic acid, malic acid, maleic acid, etc., and the inorganic acid includes hydrochloric acid, nitric acid, sulfuric acid, phosphoric acid, carbonic acid, etc., which are preferably an aqueous solution. The acid is preferably an inorganic acid, and among others, hydrochloric acid and nitric acid are preferred. In addition, these acids can also be used by mixing two or more kinds thereof. Furthermore, the reaction factor component can also be eliminated using an acidic gas instead of an aqueous solution.

The introduction amount of hydrogen ions or oxonium ions into the glass surface layer is preferably in such a range that the relationship between the average hydrogen concentration Hs in the surface layer being a region of 0 to 100 nm from the surface and the average hydrogen concentration Hb in the inside being a region of 100 to 500 nm from the surface satisfies 1.01≤Hs/Hb<50.

Here, in this embodiment, the average hydrogen concentration Hs of the surface layer and the average hydrogen concentration Hb of the inside are determined as follows.

[Method for Measuring Hydrogen Concentration]

In accordance with the following procedure, the hydrogen concentration of the glass is measured by Secondary Ion Mass Spectrometry (SIMS) to determine the average hydrogen concentrations of the surface layer and the inside. As regards the hydrogen concentration measurement, the surface layer of the glass substrate is a depth region of 0 to 100 nm from the surface, and the inside is a depth region of 100 to 500 nm from the surface.

The glass to be measured is fed into an SIMS apparatus and measured in sequence to acquire depth-direction profiles of $^1H^-$ and $^{30}Si^-$ intensities. Thereafter, the $^1H^-$ profile is divided by the $^{30}Si^-$ profile to obtain a depth-direction profile of the $^1H^-/^{30}Si^-$ intensity ratio. Here, from the depth-direction profile of $^1H^-/^{30}Si^-$ intensity ratio of each sample, the average $^1H^-/^{30}Si^-$ intensity ratio in the region at a depth of 0 to 100 nm from the surface is defined as the average hydrogen concentration Hs of the surface layer. Similarly, from the depth-direction profile of $^1H^-/^{30}Si^-$ intensity ratio of each sample, the average $^1H^-/^{30}Si^-$ intensity ratio in the region at a depth of 100 to 500 nm from the surface is defined as the average hydrogen concentration Hb of the inside. The average hydrogen concentration Hs of the surface layer is divided by the average hydrogen concentration Hb to determine Hs/Hb. The measurement conditions of SIMS are as follows.

(Measurement Conditions of SIMS)
Apparatus: ADEPT1010 manufactured by ULVAC-PHI, Inc.,
Primary ion species: $Cs^+$
Primary ion accelerating voltage: 5 kV
Primary ion current value: 200 nA
Primary ion incident angle: 60° relative to the normal line of the sample plane
Primary ion luster size: 300×300 μm²
Secondary ion polarity: minus
Secondary ion detection region: 60×60 μm² (4% of luster size of primary ion)
ESA Input Lens: 0
Use of neutralization gun: used
Method for Converting the Abscissa Axis from Sputtering Time to Depth:

The depth of the analysis crater is measured with a stylus surface profiled (Dektak 150, manufactured by Veeco Instruments Inc.) to determine the primary ion sputtering rate. Using the sputtering rate determined, the abscissa axis is converted from the sputtering time to the depth.

Field Axis Potential in $^1H^-$ Detection:

The optimum value may change in every apparatus. The measurer sets the value with care so that the background is fully cut off.

Degree of Vacuum of Main Chamber Before Start of Measurement:

A degree of vacuum higher than $3.0 \times 10^{-9}$ Torr must be provided so as to ensure measurement accuracy.

When the relationship between the thus-determined average hydrogen concentration Hs of the surface layer and average hydrogen concentration Hb of the inside is in a range satisfying 1.01≤Hs/Hb, alteration of the surface due to burning, etc. can be prevented. Hs/Hb is more preferably 1.1≤Hs/Hb, still more preferably 1.5≤Hs/Hb, yet still more preferably 5.0≤Hs/Hb, even yet still more preferably 10.0≤Hs/Hb, particularly preferably 15.0≤Hs/Hb. When the relationship between Hs and Hb is in a range satisfying Hs/Hb<50, the chemical durability of the glass is enhanced. Hs/Hb is more preferably Hs/Hb<45, still more preferably Hs/Hb<40, yet still more preferably Hs/Hb<35, even yet still more preferably Hs/Hb<25, particularly preferably Hs/Hb<20.

The acid used for the acid cleaning does not encompass a fluorine compound such as hydrofluoric acid. Typically, a fluorine compound is rich in meltability of the glass and therefore, it is difficult to control the surface roughness Ra of the glass substrate to the above-described range as in this embodiment.

The acidic solution used here preferably has a pH of 4 or less, more preferably 3 or less, still more preferably 2 or less.

Furthermore, in the acid cleaning step, the surface of the plate-shaped glass can be adjusted by appropriately adjusting the glass composition of the glass substrate and the temperature, concentration, etc. of the solution used for the surface treatment, and the concentration of the reaction factor component in the surface layer of the glass substrate can be made to be in the desired range.

The acid cleaning above may be performed by preparing an acid cleaning tank storing an acid solution and immersing the plate-shaped glass to be cleaned in the acid cleaning tank.

At this time, the concentration or temperature of the acid solution, the immersion time, etc. may be appropriately adjusted so that a glass substrate having desired properties can be obtained. As the concentration of the acid solution, for example, the pH is preferably from 0.1 to 4, more preferably from 0.5 to 3, still more preferably from 0.5 to 1.

In the case where the pH of the acid solution is 4 or less, the reaction factor component in the surface can be effectively reduced, and in the case where the pH is 0.5 or more, deterioration of the surface roughness can be prevented. In addition, the temperature of the acid solution is preferably from 20 to 90° C., more preferably from 30 to 80° C., still more preferably 30 to 50° C. In the case where the temperature is 20° C. or more, the reaction factor component in the surface can be effectively decreased, and in the case where the temperature is 90° C. or less, the decrease amount or decrease rate of the reaction factor component in the surface can be prevented from changing over time due to evaporation or concentration. Furthermore, the immersion time in the acid solution is preferably from 1 to 1,440 minutes, more preferably from 1 to 60 minutes, still more preferably from 1 to 10 minutes. In the case where the immersion time is 1 minute or more, the reaction factor component in the surface can be effectively decreased, and in the case where it is 1,440 minutes or less, the change in pH of the acid solution due to elution of glass components can be reduced, and the decrease amount or decrease rate of the reaction factor component in the surface can be prevented from changing over time.

In the case of using an aqueous nitric acid solution, a pH of from 0.5 to 2.5, a temperature of from 30 to 80° C., and an immersion time of the plate-shaped glass of from 3 to 30 minutes are preferred, a pH of from 0.5 to 1, a temperature of from 30 to 50° C., and an immersion time of the plate-shaped glass of from 3 to 10 minutes are more preferred, and a pH of from 0.5 to 1, a temperature of from 30 to 50° C., and an immersion time of the plate-shaped glass of from 3 to 5 minutes are still more preferred.

In performing the acid cleaning step, the surface of the plate-shaped glass is preferably cleaned with water or an alkali solution before the acid cleaning step so as to remove the slurry remaining on the surface that is polished in the polishing step above.

In addition, after performing the acid cleaning step, the glass substrate is preferably cleaned with water or an alkali solution so as to remove the acid solution remaining on the surface.

In the cleaning after acid cleaning, the cleaning with water or an alkali solution, in particular, is performed with care so that the surface properties of the glass substrate are as little changed as possible. For example, cleaning with water is performed at room temperature for a cleaning time of 30 minutes or less so as to avoid an unnecessary increase in the increment of water on the glass substrate surface, and cleaning with an alkali solution is performed at room temperature using an aqueous alkali solution having a pH of approximately from 9 to 13 for a cleaning time of 15 minutes or less so as to avoid an unnecessary increase in the etching amount on the glass substrate surface.

Examples of the alkali (base) used here include, for example, bases such as lithium hydroxide, sodium hydroxide, potassium hydroxide, potassium carbonate, sodium carbonate, ammonia and organic amine. One of these bases may be used alone, or a plurality thereof may be used in combination. In addition, an organic acid salt may be added as a chelating agent. Furthermore, an anionic surfactant such as polyacrylate, a cationic surfactant such as alkylamine hydrochloride, and a nonionic surfactant such as alkylphenyl polyoxyethylene ether may be added as a surfactant. It is also possible to add zeolite, etc. as a builder.

The glass substrate obtained in this way can be further subjected to a surface treatment, for example, printing, antireflection coating, and lamination of a functional film, thereby obtaining a glass substrate having predetermined functions.

The above-described glass substrate of this embodiment is a glass substrate capable of preventing deterioration due to burning, etc. of the surface and maintaining glass properties for a long period of time. Among others, the glass substrate formed of a glass having a high refractive index is suitable as an optical component of wearable equipment, a vehicle-mounted or robot-mounted light guide plate, an optical filter, etc.

Second Embodiment

The glass substrate according to a second embodiment of the present invention has the same properties as those of the glass substrate of the first embodiment but is limited in its properties regarding chromaticity as described below.

In the glass substrate of this embodiment, the chromaticity $b^*$ under the A light source in CIELab representation preferably satisfies $b^* \geq 4.8$. In the case where the chromaticity $b^*$ of the glass substrate thus satisfies the relationship above, the observed tint can be improved when the glass substrate is laminated with the later-described light control member. More specifically, in an optical component configured by stacking the glass substrate and the light control member one on another, both of chromaticities $a_c^*$ and $b_c^*$ under the A light source in CIELab representation come close to 0 in a light shielding mode of the light control member, and the tint on viewing a video, etc. through the optical component is a natural tint.

The CIELab representation as used in the present description is CIE 1976 ($L^*a^*b^*$) color space (CIELAB) standardized by the International Commission on Illumination (CIE). In the present application, lightness ($L^*$) in the A light source, and chromaticity ($a^*$, $b^*$) of reflected light in the A light source are referred to.

In the case where the chromaticity $b^*$ of the glass substrate satisfies $b^* \geq 4.8$, when the color control member is put into a light shielding (colored) state, the tint on viewing a video, etc. through the optical component configured by stacking the glass substrate and the light control member one on another comes close to natural tint. The chromaticity is preferably $b^* \geq 5$, more preferably $b^* \geq 5.5$, still more preferably $b^* \geq 6$, yet still more preferably $b^* \geq 7$, even yet still more preferably $b^* \geq 8$, particularly preferably $b^* \geq 10$.

In addition, the chromaticity $b^*$ of the glass substrate is preferably $b^* \leq 15$. In the case where the chromaticity $b^*$ satisfies $b^* \leq 15$, when the color control member is put into a light shielding (colored) state, the tint on viewing a video, etc. through the optical component configured by stacking the glass substrate and the light control member one on another comes close to natural tint. The chromaticity $b^*$ of the glass substrate is preferably $b^* \leq 14$, more preferably $b^* \leq 13$, still more preferably $b^* \leq 12$, particularly preferably $b^* \leq 11$.

Third Embodiment

The glass substrate according to a third embodiment of the present invention has the same properties as those of the glass substrate of the first and second embodiments, but its properties regarding chromaticity are slightly different in the following points. The chromaticity is specified in a different viewpoint from the second embodiment, but these embodiments include many overlapping glasses.

When the chromaticities a* and b* of the glass substrate satisfy such properties, the observed tint can be improved when the glass substrate is laminated with the light control member. More specifically, in the later-described optical component configured by stacking the glass substrate and the light control member one on another, both of chromaticities $a_c^*$ and $b_c^*$ under the A light source in CIELab representation come close to 0 in a light shielding mode of the light control member, and the tint on viewing a video, etc. through the optical component is a natural tint.

As for the chromaticity in this embodiment, the ratio (b*/|a*|) of b* to the absolute value of the chromaticity a* of the glass substrate satisfies b*/|a*|≥0.55. In the case where the ratio satisfies b*/|a*|≥0.55, when the color control member is put into a light shielding (colored) state, the tint on viewing a video, etc. through the optical component configured by stacking the glass substrate and the light control member one on another comes close to natural tint. The ratio is preferably b*/|a*|≥0.60, more preferably b*/|a*|≥0.70, still more preferably b*/|a*|≥0.80, particularly preferably b*/|a*|≥1.00. Furthermore, in addition to the relationship above, it is preferable to satisfy b*≥0.1.

Figure 3:
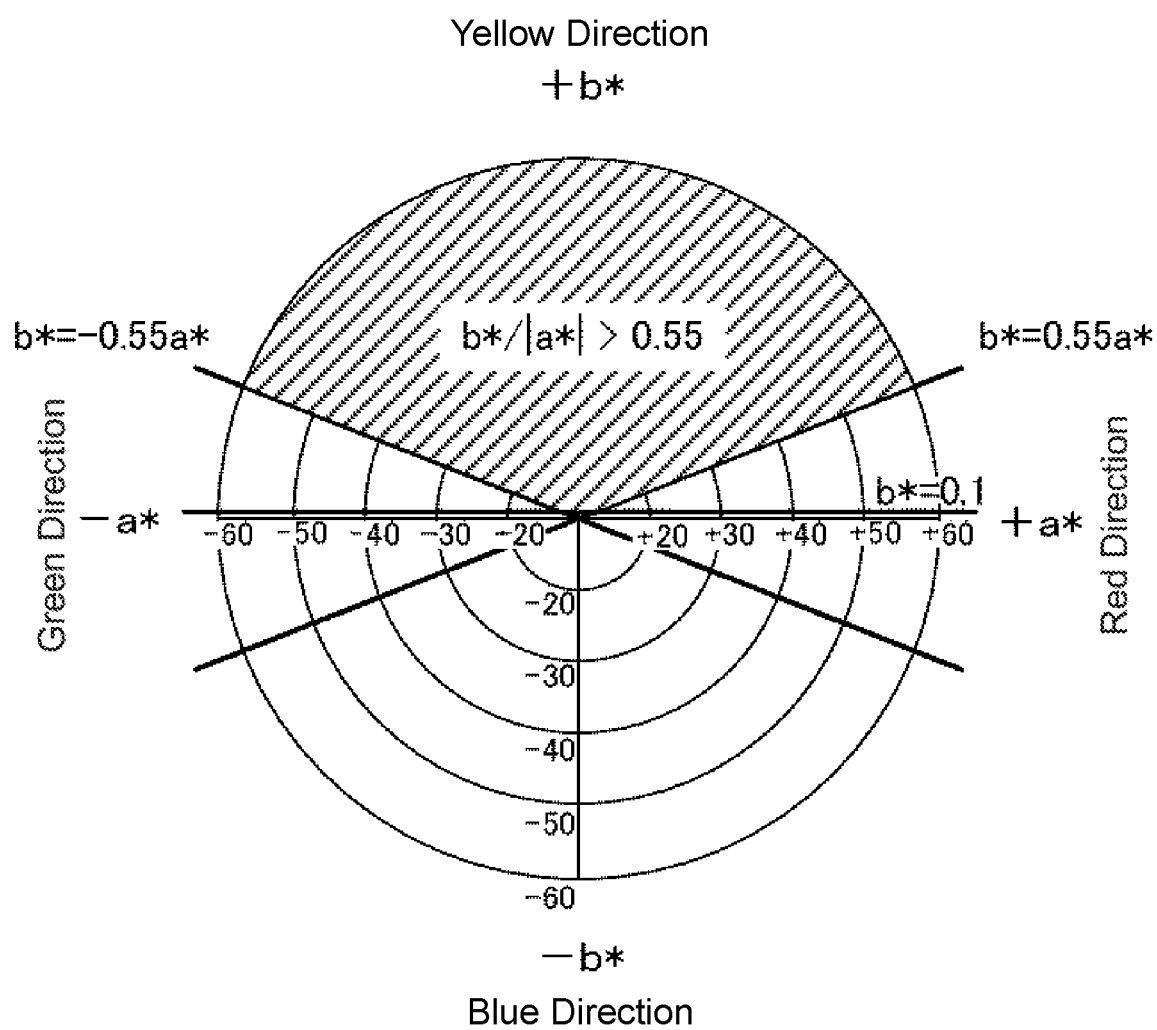
FIG. 3 is a diagram illustrating a chromaticity range in a chromaticity diagram with respect to the chromaticity of the glass substrate in a third embodiment of the present invention.

With respect to the chromaticity of the glass substrate, a chromaticity diagram indicating the region satisfying the above-described relationship is illustrated in FIG. 3.

By satisfying the region in the chromaticity diagram described above, when the color control member is put into a light shielding (colored) state, the tint on viewing a video, etc. through the optical component configured by stacking the glass substrate and the light control member one on another is not biased to a specific tint and furthermore, a reduction in lightness on viewing the surrounding scenery, etc. can be prevented.

In the third embodiment, other physical properties or shape properties and the glass composition can be described in the same manner as in the first and second embodiments. In order to satisfy the above-described chromaticity properties, it is preferable to contain Fe, Ni or Pt. The total of the contents of Fe, Ni and Pt is preferably 0.3 ppm by mass or more, more preferably 0.5 ppm by mass or more, still more preferably 1 ppm by mass or more, yet still more preferably 3 ppm by mass or more, particularly preferably 5 ppm by mass or more. On the other hand, in the case where the total of the contents of Fe, Ni and Pt is 10 ppm by mass or less, absorption of visible light is prevented in use of wearable equipment, and the internal transmittance increases.

Fourth Embodiment

[Optical Component]

The optical component of this embodiment uses the above-described glass substrate of this embodiment. At this time, the glass substrate is used in combination with other members, and, for example, an optical component obtained to have a configuration of being laminated with a light control member can be exemplified. The optical component obtained in this way includes, for example, an optical component 10 in which, as illustrated in FIG. 1, a light control member 12 is stacked on the glass substrate 11. By thus stacking the glass substrate 11 and the light control member 12 one on another, the light transmittance in the optical component 10 can be arbitrarily adjusted. More specifically, the transmittance of the optical component as a whole can be arbitrarily fluctuated by adjusting the light transmittance of the light control member 12. Although FIG. 1 illustrates a stacked configuration, the glass substrate 11 and the light control member 12 may also be arranged with a space therebetween.

The light control member 12 used here is described below. Since the glass substrate 11 is already described hereinbefore, its description is omitted.

<Light Control Member>

The light control member 12 of this embodiment is a glass where the chromaticity b* under the A light source in CIELab representation satisfies b*<0 in the light shielding mode. In the case where b* in the light shielding mode satisfies the relationship above, in the optical component 10 obtained by stacking the light control member 12 and the glass substrate 11 one on another, both of chromaticities $a_c^*$ and $b_c^*$ under the A light source in CIELab representation come close to 0 in a light shielding mode, compared with the light control member 12 alone. Consequently, the tint on viewing a video through the optical component 10 appears in natural tint. The chromaticity b* of the light control member 12 is preferably b*<−1, more preferably b*<−2, still more preferably b*<−4, particularly preferably b*<−6.

In addition, the chromaticity b* of the light control member 12 is preferably b*>−15. In the case where the chromaticity b* satisfies b*>−15, when the light control member 12 is put into a light shielding (colored) state, the tint on viewing a video, etc. through the optical component 10 configured by stacking the glass substrate 11 and the light control member 12 one on another comes close to natural tint. The chromaticity b* of the light control member 12 is preferably b*>−10, more preferably b*>−8.0, still more preferably b*>−7.0, particularly preferably b*>−6.0.

Furthermore, the light control member in this embodiment can be configured to be composed of a first substrate, a second substrate opposing the first substrate, first and second electrodes provided respectively on the first substrate and the second substrate, and a light transmission control material layer sealed between the first substrate and the second substrate.

The light control member 12 is preferably a common light control member 12 satisfying the above-described relationship regarding the chromaticity b*in a light shielding mode.

Examples of the common light control member include a light control member configured to include a first substrate, a second substrate opposing the first substrate, and a light transmission control material layer sealed between the first substrate and the second substrate.

With respect to the light control member, examples of the light transmission control material layer include (1) a liquid crystal material layer, (2) an inorganic electroluminescence material layer, (3) an electrophoretic dispersion liquid layer composed of a number of charged electrophoretic particles and a dispersion medium having a color different from that of the electrophoretic particles, (4) an electrodeposition scheme (electrodeposition•electric field deposition) material layer to which an electrodeposition•dissociation phenomenon caused by a reversible oxidation-reduction reaction of a metal (for example, silver particle) is applied, (5) an electrochromic material layer to which a color change of a material caused by an oxidation-reduction reaction is applied, and (6) an electro-wetting material layer that controls the light transmittance by an electro-wetting phenomenon.

Here, in the case of using (2) the inorganic electroluminescence material layer, examples of the material constituting the light transmission control material layer include an organic one, a tungsten-based one, etc. Such a light control member takes on a bluish color tone in light shielding mode.

Examples of such a color control member 12 include, for example, Automatic-dimming mirror manufactured by Gentex, EC Glass (auto-dimming) manufactured by MagnaMirror, SageGlass manufactured by SAGE, and Hailo manufactured by Kinestral.

Here, in the optical component, it is preferable to arrange the glass substrate and the light control member in this order from the observer side, but it may also be possible to arrange in the order of the light control member and the glass substrate from the observer side.

In the optical component 10 of this embodiment, the glass substrate 11 and the light control member 12 are used in a stacked manner, and by thus using them in a stacked manner, the tint of a video, etc. observed by creating a light shielding (colored) state can be recognized as natural tint.

In the optical component 10 of this embodiment, denoting $a_c^*$ and $b_c^*$ as the chromaticities of a configuration (optical component 10) formed by stacking the glass substrate 11 and the light control member 12 one on another, the chromaticity is preferably $|a_c^*|\beta \leq 3.1$. Within this range, the tint of a video, etc. observed through the optical component 10 provides a color close to natural color. The chromaticity of the chromaticity $a_c^*$ structure is preferably $|a_c^*|\leq 2.9$, more preferably $|a_c^*|\leq 2.7$, still more preferably $|a_c^*|\leq 2.5$, particularly preferably $|a_c^*|\leq 2.4$.

In the optical component 10 of this embodiment, the chromaticity is preferably $|b_c^*|\leq 4.9$. Within this range, the tint of a video, etc. observed through the optical component 10 provides a color close to natural color. The chromaticity of the optical component 10 is preferably $|b_c^*|\leq 4.6$, more preferably $|b_c^*|\leq 4.3$, still more preferably $|b_c^*|\leq 4$, particularly preferably $|b_c^*|\leq 3.5$.

Furthermore, in the optical component 10 of this embodiment, the chromaticities $a_c^*$ and $b_c^*$ preferably satisfy the following relation (1):

$$\sqrt{a_c^{*2}b_c^{*2}} \leq 5.9 \qquad [\text{Math. 1}]$$

Within this range, the color of the outside world on viewing the outside world through the structure is a natural color. The relation (1) of chromaticities is preferably 5.7 or less, more preferably 5.5 or less, still more preferably 5 or less, particularly preferably 4 or less.

In addition, the relation (1) of chromaticities is preferably 0.1 or more. In the case where the relation (1) of chromaticities is 0.1 or more, an adverse effect of ultraviolet light on eyes can be reduced. The relation (1) of chromaticities is preferably 0.3 or more, more preferably 0.5 or more, particularly preferably 1.0 or more.

In the optical component of this embodiment, the chromaticity under the A light source in CIELab representation in a light shielding mode of the light control member is preferably included in a region surrounded by point 1 of $a_c^*=10$, $b_c^*=10$, point 2 of $a_c^*=10$, $b_c^*=-10$, point 3 of $a_c^*=-10$, $b_c^*=-10$, and point 4 of $a_c^*=-10$, $b_c^*=10$. In the case where the chromaticity of the optical component is in the region surrounded by these four points, the tint on viewing a video, etc. through the optical component 10 configured by stacking the glass substrate 11 and the light control member 12 one on another comes close to natural tint. Point 1 is more preferably $(a_c^*=5, b_c^*=5)$, still more preferably $(a_c^*=5, b_c^*=2.5)$. Point 2 is more preferably $(a_c^*=5, b_c^*=-5)$. Point 3 is more preferably $(a_c^*=-5, b_c^*=-5)$, still more preferably $(a_c^*=-2.5, b_c^*=-5)$. Point 4 is more preferably $(a_c^*=-5, b_c^*=5)$, still more preferably $(a_c^*=-2.5, b_c^*=-2.5)$.

Although FIG. 1 illustrates an example where the glass substrate 11 and the color control member 12 having the same size are stacked, it is also possible to provide the light control member 12 on a part of the glass substrate 11 or provide the glass substrate 12 on a part of the light control member 12.

As the material constituting the first substrate and the second substrate used for the light control member of this embodiment, examples thereof include, specifically, a transparent glass substrate such as soda lime glass and white plate glass, a plastic substrate, a plastic sheet, and a plastic film. Here, the plastic includes polyethylene terephthalate, polyethylene naphthalate, polycarbonate, a cellulose ester such as cellulose acetate, a fluoropolymer such as a copolymer of polyvinylidene fluoride or polytetrafluoroethylene with hexafluoropropylene, a polyether such as polyoxymethylene, polyacetal, polystyrene, polyethylene, polypropylene, a polyolefin such as methylpentene polymer, a polyimide such as polyamideimide or polyetherimide, polyamide, polyethersulfone, polyphenylenesulfide, polyvinylidene fluoride, tetraacetyl cellulose, brominated phenoxy, polyarylate, polysulfone, etc. The plastic sheet or plastic film may have rigidity not allowing the sheet or film to easily bend or may have flexibility. In the case of constituting the first substrate and the second substrate by a transparent plastic substrate, a barrier layer composed of an inorganic material or an organic material may be formed on an inner face of the substrate.

In the first substrate and second substrate of the light control member of this embodiment, the thickness is preferably 0.01 mm or more. In the case where the thickness is 0.01 mm or more, breakage during handling or processing of the light control member can be reduced. In addition, deflection due to own weight of the optical glass is prevented. The thickness is more preferably 0.1 mm or more, still more preferably 0.3 mm or more, yet still more preferably 0.5 mm or more, particularly preferably 0.7 mm or more. On the other hand, in the case where the thickness is 2.0 mm or less, the transmission state and the colored state each can be successfully fluctuated by dimming. The thickness is more preferably 1.5 mm or less, still more preferably 1.0 mm or less, yet still more preferably 0.8 mm or less, particularly preferably 0.6 mm or less.

Fifth Embodiment

[Optical Equipment]

The optical equipment of this embodiment uses the optical component of this embodiment.

Examples of the optical equipment include (1) a display, a filter, a lens, etc. used for the wearable equipment such as, for example, glasses with projector, a glasses-shaped or goggles-shaped display, a virtual reality and augmented reality display device, and a virtual image display device, and (2) a lens, a cover glass, etc. used for a vehicle-mounted camera, a robot's visual sensor, etc.

Figure 2:
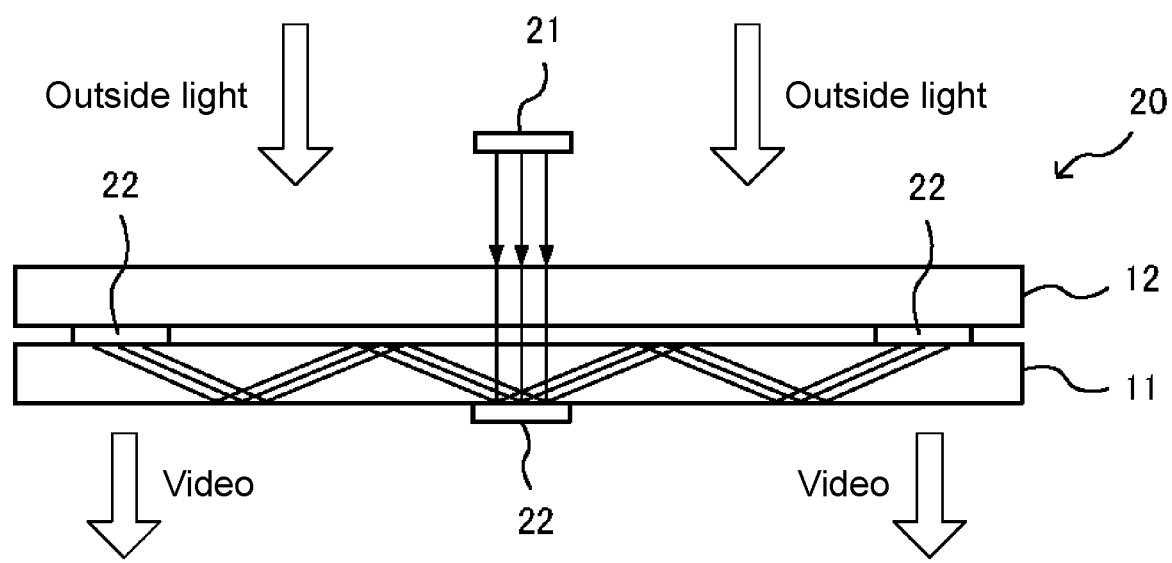
FIG. 2 is a view for illustrating the configuration and function in the case where the optical component in one embodiment of the present invention is applied to a head-mount display.

As one example of the wearable equipment, FIG. 2 illustrates a schematic configuration of the optical equipment 20 capable of applying the optical component 10 to a head-mount display or a goggles-shaped display. The optical equipment 20 is the same as the optical component 10 illustrated in FIG. 1 in that the glass substrate 11 and the light control member 12 are stacked one on another, but here, the equipment has a display element 21 for displaying a video, and a propagation unit 22 for making the video displayed on the display element 21 incident on the glass substrate 11 via the light control member 12, totally reflecting the incident video in the inside of the glass substrate 11, and propagating the video to the eye of a person wearing the optical equipment 20.

The display element 21 is an element for displaying a video, and the video displayed here is made incident on the glass substrate 11 via the light control member 12. At this time, the display element 21 may have a backlight.

The optical element is disposed so that the video incident on the glass substrate 11 is diffracted to propagate to a predetermined position while being totally reflected inside the glass substrate 11 by the propagation unit 22 and furthermore, the video propagated to the predetermined position is diffracted toward the eye of a person wearing the optical equipment 20.

At this time, in the case of a bright environment such as outdoors, the video is sometimes hard to see due to strong outside light. On such an occasion, in the optical equipment 20 of this embodiment, the light control member 12 is put into a light shielding state to reduce the effect of outside light, and the image can thereby be made easy to see. At this time, furthermore, the tint perceived through the glass substrate 11 and the light control member 12 is improved as described above and therefore, a video with a color close to the original tint can be viewed.

The light transmission state of the light control member 12 may be arbitrarily adjusted by the user or may be automatically adjusted by sensing the intensity of outside light by a sensor, etc., or these may be combined.

In the glass substrate of this embodiment, the crack generation load L is preferably 300 mN or more. In the case where the total depletion amount of the reaction factor component in the surface layer of the glass substrate is large (i.e., the relationship between the average hydrogen concentration Hs in the surface layer and the average hydrogen concentration Hb in the inside satisfies $1.01 \leq Hs/Hb < 50$), a layer having a more sparse glass structure is formed in the surface layer and due to an effect of allowing the glass structure to be densified upon contacting of a sharp foreign matter, etc. with the optical glass and thereby facilitating absorption of the impact, the strength of the glass is enhanced. Thanks to this effect, in the case where the glass substrate is processed into a product, an optical glass capable of reducing breakage from falling, etc. is obtained. The crack generation load is more preferably 350 mN or more, still more preferably 400 mN or more, yet still more preferably 450 mN or more, even yet still more preferably 500 mN or more, particularly preferably 550 mN or more.

Here, the crack generation load as used in this embodiment can be obtained by the following method. In a constant-temperature constant-humidity chamber kept at a humidity of 30% and a temperature of 25° C., a Vickers indenter set at a load 10 g, 25 g, 50 g, 100 g and 200 g is indented into the glass surface (optically polished surface) for 15 seconds, and after 15 seconds, the number of cracks generated from four corners of the indentation is counted (up to 4 for one indentation). This operation is repeated 20 times (i.e., the indenter is driven 20 times) at each load and after counting total number of cracks, the crack generation ratio is calculated in accordance with (total number of crack generations)/80. The obtained crack generations are plotted with respect to the load, a sigmoid function is fitted by a least square method, and the load at which the crack generation ratio becomes 50% is defined as the crack generation load L.

EXAMPLES

The present invention is further described below by referring to specific Examples and Comparative Examples. Cases 1 to 5 are Examples of the invention, and Case 6 is Comparative Example.

(Cases 1 to 6)

First, a plate-shaped $SiO_2$-based glass (refractive index: 1.78) of 50 mm in length, 50 mm in width and 0.5 mm in thickness containing, as represented by mass % based on oxides, a total of 12.1% of Li, Na and K as reaction factor components and being manufactured under the same processing conditions using cerium oxide abrasive grain and a hard urethane pad, was prepared. The surface of the plate-shaped glass was cleaned by immersion in an alkali solution so as to previously remove stains attached in polishing, etc. and then cleaned by immersion in pure water. The surface roughness Ra of the main surface of each plate-shaped glass prepared was 0.7 nm.

In Case 1, the plate-shaped glass was directly used without further applying polishing treatment, and in Cases 2 to 6, each plate-shaped glass was fixed on a rotating surface plate of a polishing machine (trade name: Fam12BS, manufactured by Speed Farm) and while the rotating surface plate was rotated at a rotational speed of 40 rpm, the main surface having a surface roughness Ra of 0.7 nm was polished using a polishing slurry and a polishing pad. In this polishing, the polishing pressure was 5.3 kPa and a urethane pad as the polishing pad, thereby obtaining a glass substrate having a predetermined surface roughness Ra as shown in Table 1.

In polishing, in Cases 2 to 6, polishing for a total of 40 minutes, with the polishing time per one surface being 20 minutes, was performed using a polishing slurry containing 10 mass % of SHOROX A20 (produced by Showa Denko K.K., average grain size: 2 μm) as the abrasive grain and 90 mass % of water as the dispersion medium. In Case 5, subsequent to the polishing with SHOROX A20, polishing for a total of 40 minutes, in which the polishing time per one surface was 20 minutes, was performed using a polishing slurry containing 10 mass % of COMPOL 80 (produced by Fujimi Incorporated) as the abrasive grain and 90 mass % of water as the dispersion medium.

Subsequently, in Cases 1 to 5, each glass substrate after the polishing treatment (in Case 1, the polishing treatment was not performed) was subjected to an acid treatment by immersion for any duration of time of 10 minutes, 60 minutes and 1,080 minutes by using, as the acid treatment solution, an aqueous nitric acid solution adjusted to a pH of 2. As shown in Table 1, the acid treatment solution was adjusted to either temperature of 25° C. or 80° C. After the acid treatment, all samples were held under running pure water for 10 minutes to rinse away the acid treatment solution and obtain glass substrates.

It was confirmed that the surface roughness Ra of each glass substrate after the acid treatment was equal to the surface roughness Ra before the acid treatment. Furthermore, in Case 6, the glass substrate after the polishing treatment was used as the sample without performing the acid treatment step.

TABLE 1

| | Plate-shaped Glass | | Acid Treatment | |
| | Polishing | Surface Roughness Ra [nm] | pH | Treatment Temperature | Treatment Time |
| --- | --- | --- | --- | --- | --- |
| Case 1 | — | 0.7 | pH 2 | 25° C. | 10 min |
| Case 2 | applied | 0.5 | pH 2 | 25° C. | 10 min |
| Case 3 | applied | 0.5 | pH 2 | 80° C. | 60 min |
| Case 4 | applied | 0.5 | pH 2 | 80° C. | 1080 min |

TABLE 1-continued

| | Plate-shaped Glass | | | | |
|---|---|---|---|---|---|
| | | Surface | Acid Treatment | | |
| | Polishing | Roughness Ra [nm] | pH | Treatment Temperature | Treatment Time |
| Case 5 | applied | 0.3 | pH 2 | 25° C. | 10 min |
| Case 6 | applied | 0.5 | — | — | — |

TABLE 2

| | Depletion Amount of Reaction Factor Component [mol/cm$^2$] | | | | Decrease rate of Reaction Factor Component [%] | | | | Amount of Transmittance Change | |
|---|---|---|---|---|---|---|---|---|---|---|
| | $C_{Li}$ | $C_{Na}$ | $C_K$ | $C_{Total}$ | $R_{Li}$ | $R_{Na}$ | $R_K$ | $R_{Total}$ | Evaluation | [%] |
| Case 1 | 1.09E−08 | 3.38E−09 | 1.96E−09 | 1.62E−08 | 65.2 | 41.1 | 30.9 | 50.1 | medium | 1.41 |
| Case 2 | 1.09E−08 | 3.38E−09 | 1.96E−09 | 1.62E−08 | 65.2 | 41.1 | 30.9 | 50.1 | medium | 1.22 |
| Case 3 | 1.63E−08 | 6.13E−09 | 2.73E−09 | 2.52E−08 | 92.4 | 76.0 | 56.9 | 79.6 | small | 0.73 |
| Case 4 | 6.92E−08 | 2.96E−08 | 1.58E−08 | 1.15E−07 | 99.4 | 96.2 | 78.7 | 93.9 | small | 0.59 |
| Case 5 | 1.09E−08 | 3.38E−09 | 1.96E−09 | 1.62E−08 | 65.2 | 41.1 | 30.9 | 50.1 | medium | 1.05 |
| Case 6 | 7.26E−09 | 1.14E−09 | 8.17E−10 | 9.22E−09 | 44.7 | 24.7 | 14.3 | 31.7 | large | 1.95 |

<Surface Roughness Ra>

After the polishing treatment of Cases 1 to 6, the surface roughness of the plate-shaped glass before acid treatment was measured using an atomic force microscope (manufactured by Asylum, model: Cypher S). The measurement conditions are shown below.

Measurement mode: Dynamic Force Mode
Scan speed: 2.44 Hz
Cantilever: Cantilever AC55 manufactured by Olympus
Evaluation area: 2 μm×2 μm square
Resolution: 512 pixels×512 pixels
Image analysis software: SPIP (Scanning Probe Image Processor) manufactured by Image Metrology Inc.

<Depletion Amount of Reaction Factor Component and Decrease rate of Reaction Factor Component>

First, the SiO$_2$-based glass substrate in Examples above contained alkali metals of Li, Na and K as the reaction factor component, and the contents (mass % in terms of atom) of Li, Na and K in the glass substrate were measured as follows. A small piece was cut out from the glass substrate, and the weight (mg) of the small glass piece was measured by means of an electronic balance, etc. Thereafter, the small glass piece was dissolved using, for example, a mixed acid of hydrofluoric acid and sulfuric acid, and the solution was made up to a constant volume. The concentrations (mg/L) of Li, Na and K in the solution were measured by atomic absorption spectrometry. Denoting W (mg) as the weight of the small glass piece, V (L) as the dissolution volume, and $Y_R$ (mg/L) as the concentration of the alkali metal R in the solution, the content $Z_R$ (mass % on an atomic basis) of the alkali metal R in the glass substrate was calculated in accordance with the following relation (2):

$$Z_R = (Y_R \times V)/W \times 100 \quad (2)$$

[R=Li, Na, K]

Next, the density (g/cm$^3$) of the glass was measured in conformity with JIS Z 8807 (1976, measuring method where weighting is performed in liquid). On the condition that the atomic weight of Li is 6.941 (g/mol), the atomic weight of Na is 22.99 (g/mol), and the atomic weight of K is 39.10 (g/mol), the molar concentrations (mol/cm$^3$) of contents of Li, Na and K in the glass substrate were respectively calculated from the contents (mass % on an atomic basis) of Li, Na and K and density (g/cm$^3$) measured by the methods above. The molar concentrations (mol/cm$^3$) of Li, Na and K in the inside of the glass substrate are equivalent to the molar concentrations (mol/cm$^3$) of contents of Li, Na and K in the glass substrate. Here, the molar concentration (mol/cm$^3$) of the alkali metal R in the inside of the glass substrate is denoted by BR. The compositions of the glass substrates used in Cases 1 to 6 were the same, and the molar concentrations of Li, Na and K in the inside of the glass substrate, i.e., $B_{Li}$, $B_{Na}$ and $B_K$, were 0.0069, 0.0048, and 0.0032, respectively.

Figure 4:
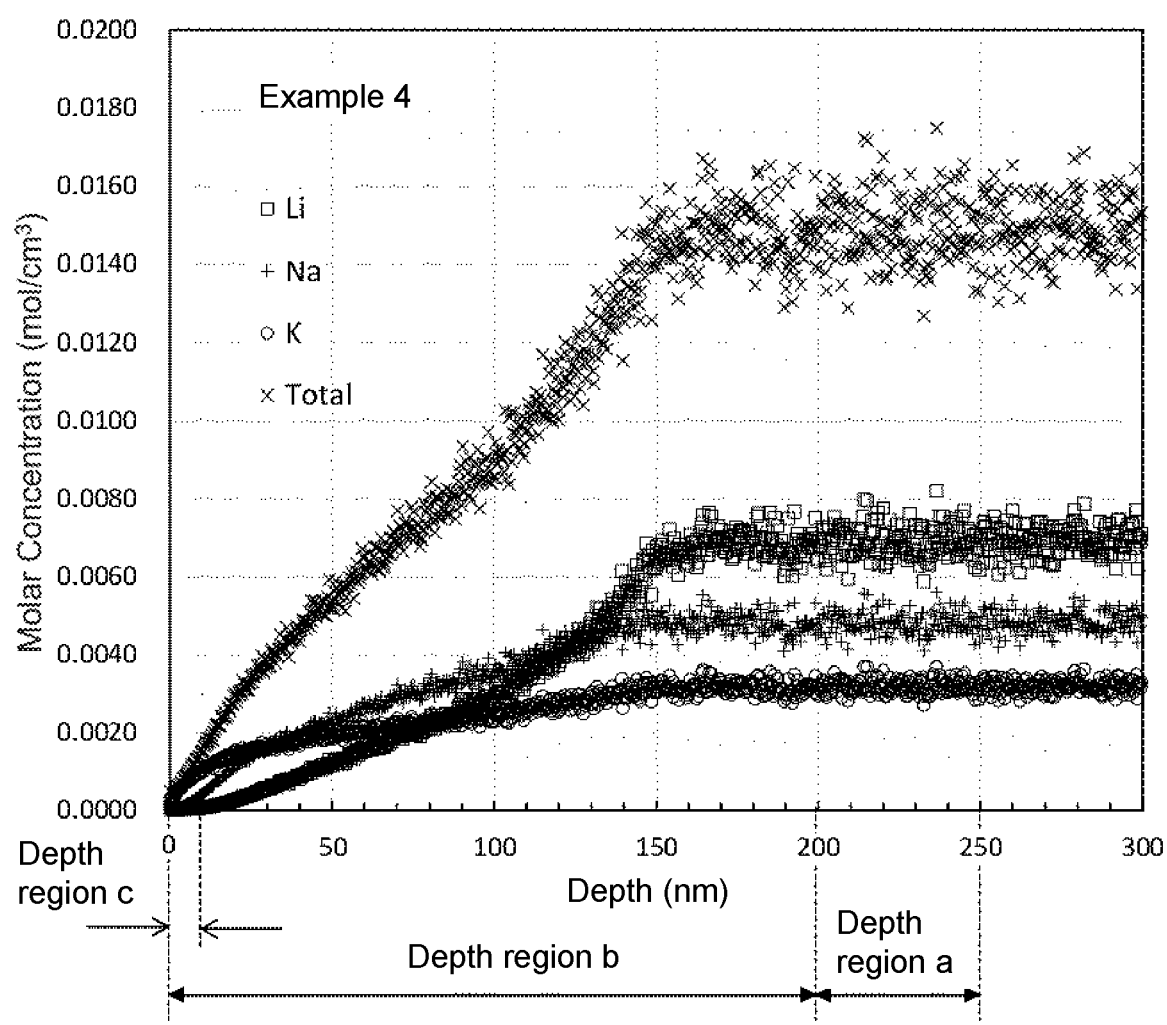
FIG. 4 is a diagram illustrating a depth-direction profile of the total alkali metal (Total) of Li, Na and K of the glass substrate obtained in Case 4 of the present invention.

With respect to the glass substrates obtained in Cases 2 to 4 and 6, the depth-direction profiles of secondary ion intensity of $^7$Li$^+$, $^{23}$Na$^+$, $^{41}$K$^+$, and $^{28}$Si$^+$ were acquired by Time-of-flight secondary ion mass spectrometry (TOF-SIMS) using C$_{60}$ ion sputtering. Thereafter, the glass substrate was taken out from the TOF-SIMS apparatus, and the depth of analysis crater formed by TOF-SIMS was measured with a stylus surface profiler such as Dektak 150 manufactured by Veeco Instruments Inc. Based on the measured depth of analysis crater, the abscissa axis of the depth-direction profile of secondary ion intensity was converted from the sputtering time to the depth. Subsequently, a depth-direction profile of Li/Si intensity ratio, with the ordinate axis representing a value obtained by dividing the secondary ion intensity of $^7$Li$^+$ by the secondary ion intensity of $^{28}$Si$^+$, a depth-direction profile of Na/Si intensity ratio, with the ordinate axis representing a value obtained by dividing the secondary ion intensity of $^{23}$Na$^+$ by the secondary ion intensity of $^{28}$Si$^+$, and a depth-direction profile of K/Si intensity ratio, with the ordinate axis representing a value obtained by dividing the secondary ion intensity of $^{41}$K$^+$ by the secondary ion intensity of $^{28}$Si$^+$, were prepared. With respect to the depth-direction profiles of Li/Si, Na/Si and K/Si intensity ratios, depth regions a in which the intensity ratio becomes constant in the depth direction were determined, and the average intensity ratio within each depth region a was calculated. At this time, the width of the depth region a was adjusted to be about 50 nm. The average intensity within the depth region a means the average intensity in the inside. The depth regions a of Cases 2 and 6 were adjusted to be from 100 to 150 nm, and the depth regions a of Cases 3 and 4 were adjusted to be from 200 to 250 nm. Furthermore, using the average intensity ratios of Li/Si, Na/Si and K/Si in the depth regions a and $B_{Li}$, $B_{Na}$ and $B_K$ (mol/cm$^3$) calculated by the method above, a calibration curve passing through the origin was prepared for each alkali metal. Based on the calibration curves obtained, the ordinate axis of each depth-direction profile of Li/Si, Na/Si and K/Si intensity ratios was converted from the intensity ratio to the molar concentration (mol/cm³). Through such a series of procedures, with respect to the glass substrates obtained in Cases 2 to 4 and 6, the depth-direction profiles of Li, Na and K, with the abscissa axis representing the depth and the ordinate axis representing the molar concentration, were obtained. As an example, FIG. 4 illustrates the depth-direction profile of Case 4. With respect to the glass substrates obtained in Cases 1 and 5, TOF-SIMS using $C_{60}$ ion sputtering was not conducted, but these glass substrates were acid-treated under the same conditions as in Case 2 and therefore, judged to have the same depth-direction profiles of Li, Na and K as in Case 2.

Regions (depth region b) in which the surface depletion layer of Li, Na and K is sufficiently included were determined from the depth-direction profiles of Li, Na and K of the glass substrates obtained in Cases 2 to 4 and 6. The width of the depth region b is appropriately adjusted depending on the thickness of the surface depletion layer. The depth regions b of Cases 2 and 6 were adjusted to be from 0 to 100 nm, and the depth regions b of Cases 3 and 4 were adjusted to be from 0 to 200 nm. Here, assuming that $C_R$ is the depletion amount (mol/cm²) of the alkali metal R, b is the width (cm) of the depth region b, and $S_R$ is the average molar concentration (mol/cm³) of the alkali metal R within the depth region b, $C_R$ is estimated from relation (3). In addition, the total depletion amount $C_{Total}$ of alkali metals in the surface layer is estimated from relation (4).

$$C_R = (B_R \times b) - (S_R \times b) \quad (3)$$

$$C_{Total} = C_{Li} + C_{Na} + C_K \quad (4)$$

From the depth-direction profiles of Li, Na and K in the glass substrates obtained in Cases 2 to 4 and 6, denoting c as the depth region of 0 to 10 nm from the surface, averages of the molar concentrations (mol/cm³) of Li, Na and K within the depth region c were determined. The depth region c means the outermost surface layer. Here, the average value of the molar concentration (mol/cm³) of the alkali metal R within the depth region c is denoted by $OS_R$, and RR estimated from relation (5) is defined as the decrease rate (%) of the alkali metal R in the outermost surface layer. In addition, letting the sum of $OS_{Li}$, $OS_{Na}$ and $OS_K$ be the average value ($OS_{Total}$) of the total molar concentration of alkali metals in the outermost surface layer and letting the sum of $B_{Li}$, $B_{Na}$ and $B_K$ be the total molar concentration ($B_{Total}$) of alkali metals in the inside, $R_{Total}$ estimated from relation (6) is defined as the decrease rate (%) of alkali metal in the outermost surface layer.

$$R_R = \{(B_R - OS_R)/B_R\} \times 100 \quad (5)$$

$$R_{Total} = \{(B_{Total} - OS_{Total})B_{Total}\} \times 100 \quad (6)$$

The analysis conditions of TOF-SIMS of the glass substrates obtained in Cases 2 to 4 and 6 are shown below. In TOF-SIMS, it is imperative to select $C_{60}^+$ or $C_{60}^{++}$ for the sputtering ion species, and other analysis conditions may be appropriately changed depending on the secondary ion intensities of $^7Li^+$, $^{23}Na^+$, $^{41}K^+$ and $^{28}Si^+$ monitored or the thickness of the surface depletion layer of alkali metal in the surface layer. In addition, in the case where the secondary ion intensity of $^7Li^+$ is strong, $^6Li^+$ that is an isotope may be monitored, and in the case where the secondary ion intensity of $^{41}K^+$ is weak, $^{39}K^+$ that is an isotope may be monitored. In the case where appropriate secondary ion intensities of $^7Li^+$, $^{23}Na^+$, $^{41}K^+$ and $^{28}Si^+$ are not obtained under the same analysis conditions, TOF-SIMS may be again performed under different analysis conditions.

Apparatus: TOF-SIMS 5 manufactured by ION-TOF
Primary ion species: $Bi_5^{++}$
Primary ion current: 0.05 pA@10 kHz
Primary ion luster size: 20×20 μm²
Sputtering ion species: $C_{60}^{++}$
Sputtering ion current: 0.4 nA@10 kHz
Sputtering ion luster size: 150×150 μm²
Sputtering mode: non-interlaced mode
Cycle time: 100 μs <Amount of Transmittance Change>

With respect to the glass substrates obtained in Cases 1 to 6, a high-temperature high-humidity test was performed using a constant-temperature constant-humidity tester (compact ultra-low temperature chamber MINI-SUB-ZERO MC-812, manufactured by ESPEC CORP.) by leaving the glass substrate to stand still for 100 hours in a test chamber set at 85° C. and a relative humidity of 85%. The transmittance of the glass substrate was measured before and after the high-temperature high-humidity test, and the amount of change thereof was calculated. Here, the amount of change was evaluated in accordance with the following criteria, and the results are shown in Table 2.

Small: less than 1%, medium: 1% or more and less than 1.5%, large: 1.5% or more.

In the glass substrates of Cases 1 to 5, the amount of transmittance change is small, and this reveals that the deterioration of transparency due to alteration such as burning is small.

In Case 1, the amount of transmittance change is small and therefore, this is categorized into Example of the invention, but since additional polishing is not applied and Ra is 0.7 nm, the glass substrate has a problem of, for example, causing fine scratches on the surface and being low in strength and is not suitable for constituting optical equipment.

While the invention has been described in detail and with reference to specific embodiments thereof, it will be apparent to one skilled in the art that various changes and modifications can be made therein without departing from the spirit and scope of the invention. The present application is based on Japanese patent application No. 2018-096341 filed on May 18, 2018, and the contents thereof are incorporated herein by reference.

REFERENCE SIGNS LIST

10: Optical component, 11: glass substrate, 12: light control member, 20: optical equipment, 21: display element, 22: propagation unit.

The invention claimed is:

1. A glass substrate, comprising at least one selected from the group consisting of Li, Na, K, Mg, Ca, Sr, Ba and Zn as a reaction factor component, and comprising a surface depletion layer at a surface side of the glass substrate, wherein:
  a total molar concentration (mol/cm³) of the reaction factor component in the surface depletion layer is decreased relative to an inside of the glass substrate;
  a total depletion amount (mol/cm²) of the reaction factor component in the surface depletion layer is $1.00 \times 10^{-8}$ or more; and
  the glass substrate has a refractive index ($n_d$) of 1.68 or more.

2. A glass substrate, comprising at least one selected from the group consisting of Li, Na, K, Mg, Ca, Sr, Ba and Zn as a reaction factor component, wherein:
an average value of a total molar concentration (mol/cm$^3$) of the reaction factor component in an outermost surface layer being a region of 0 to 10 nm from a surface of the glass substrate relative to a total molar concentration (mol/cm$^3$) of a reaction factor component in an inside of the glass substrate is 35.0% or more and 100.0% or less in terms of decrease rate; and
the glass substrate has a refractive index ($n_d$) of 1.68 or more.

3. The glass substrate according to claim 1, wherein a surface roughness Ra measured with a resolution of 512 pixels×512 pixels in a range of 2 μm×2 μm square by use of an atomic force microscope is 0.7 nm or less.

4. The glass substrate according to claim 3, wherein the surface roughness Ra is 0.5 nm or less.

5. The glass substrate according to claim 1, having a thickness of from 0.01 to 2.0 mm.

6. The glass substrate according to claim 1, wherein a content of the reaction factor component based on oxides is from 0.1 to 75 mass %.

7. The glass substrate according to claim 1, wherein a content of at least one selected from the group consisting of Li, Na and K being the reaction factor component based on oxides is from 0 to 20 mass %.

8. The glass substrate according to claim 1, wherein a chromaticity b* under the A light source in CIELab representation satisfies b*≥4.8.

9. The glass substrate according to claim 1, wherein:
a ratio (b*/|a*|) of b* to an absolute value of a chromaticity a* under the A light source in CIELab representation satisfies b*/|a*|≥0.55; and
b*≥0.1 is satisfied.

10. The glass substrate according to claim 1, having a crack generation load of 300 mN or more.

11. An optical component comprising the glass substrate according to claim 1.

12. The glass substrate according to claim 6, wherein the reaction component is at least one selected from the group consisting of Li, Na, and K.

13. The glass substrate according to claim 2, wherein a content of the reaction factor component based on oxides is from 0.1 to 75 mass %.

14. The glass substrate according to claim 13, wherein the reaction component is at least one selected from the group consisting of Li, Na, and K.

* * * * *